United States Patent
Imada

(10) Patent No.: US 12,081,141 B2
(45) Date of Patent: Sep. 3, 2024

(54) MODULAR MULTILEVEL CONVERTER WITH CURRENT FAILURE DETECTION

(71) Applicant: Mitsubishi Electric Corporation, Tokyo (JP)

(72) Inventor: Noriyuki Imada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 231 days.

(21) Appl. No.: 17/787,999

(22) PCT Filed: Mar. 4, 2020

(86) PCT No.: PCT/JP2020/009249
§ 371 (c)(1),
(2) Date: Jun. 22, 2022

(87) PCT Pub. No.: WO2021/176614
PCT Pub. Date: Sep. 10, 2021

(65) Prior Publication Data
US 2023/0027927 A1    Jan. 26, 2023

(51) Int. Cl.
*H02M 7/483*      (2007.01)
*H02M 1/00*      (2006.01)
*H02M 1/32*      (2007.01)

(52) U.S. Cl.
CPC ....... *H02M 7/4835* (2021.05); *H02M 1/0009* (2021.05); *H02M 1/32* (2013.01)

(58) Field of Classification Search
CPC ....... H02M 7/4835; H02M 7/483; H02M 1/32
See application file for complete search history.

(56) References Cited

U.S. PATENT DOCUMENTS

| | | | |
|---|---|---|---|
| 2010/0066174 A1* | 3/2010 | Dommaschk | H02M 5/4585 361/19 |
| 2016/0056727 A1* | 2/2016 | Mukunoki | H02M 7/483 363/68 |

(Continued)

FOREIGN PATENT DOCUMENTS

JP     2017103919 A     6/2017

OTHER PUBLICATIONS

International Search Report (PCT/ISA/210) with translation and Written Opinion (PCT/ISA/237) mailed on May 26, 2020, by the Japan Patent Office as the International Searching Authority for International Application No. PCT/JP2020/009249. (8 pages).

(Continued)

*Primary Examiner* — Alex Torres-Rivera
(74) *Attorney, Agent, or Firm* — Buchanan Ingersoll & Rooney PC

(57) ABSTRACT

An MMC-type power conversion device includes a failure detection unit that detects presence or absence of failure of each of n upper arm current detectors and n lower arm current detectors. The failure detection unit makes a first determination based on comparison between a sum of detection values of n upper arm current detectors and the sum of detection values of n lower arm current detectors, a second determination based on comparison between a current command value and the sum of detection values of n upper arm current detectors, a third determination based on comparison between a current command value and the sum of detection values of n lower arm current detectors, and a fourth determination of comparing, for each phase, the sum of detection values of the current detectors of an upper arm and a lower arm of the same phase.

14 Claims, 16 Drawing Sheets

(56) References Cited

U.S. PATENT DOCUMENTS

2016/0308458 A1\* 10/2016 Jimichi ................... H02M 7/06
2017/0047860 A1\* 2/2017 Fujii .................... H02M 7/2173
2017/0310237 A1\* 10/2017 Uda ..................... H02H 7/1257
2018/0358888 A1 12/2018 Depreville et al.
2019/0068076 A1\* 2/2019 Uda ..................... H02M 7/483

OTHER PUBLICATIONS

Extended European Search Report dated Mar. 10, 2023, issued in the corresponding European Patent Application No. 20923135.6, 12 pages.

\* cited by examiner (a)  (b)

MODULAR MULTILEVEL CONVERTER WITH CURRENT FAILURE DETECTION

TECHNICAL FIELD

The present disclosure relates to a power conversion device.

BACKGROUND ART

Modular multilevel converters (MMCs) are known as large-capacity power conversion devices installed in power systems. MMCs are applied to, for example, large-capacity static VAR compensators or AC-DC power conversion devices for high voltage direct current power transmission.

An MMC includes a plurality of arms, and each arm includes a plurality of unit converters (hereinafter referred to as "converter cells") connected in cascade. Typically, a converter cell includes a plurality of switching elements and a power storage element (typically, capacitor).

In the MMC, a current detector is installed in each arm in order to detect current flowing through the arm. When the MMC is used as an AC/DC power conversion device, a current detector may be installed on a DC line. A current detector may also be installed on an AC line. Current values detected by the current sensors are used to control the operation of the MMC and to determine protective operation.

The current detectors often do not contain a self-diagnostic device. Therefore, in order to determine whether each current detector is failed, at least two current detectors need to be provided at the same location so that the detected current values are compared. Furthermore, three or more current detectors need to be installed at the same location in order to identify a failed current detector by a majority rule and continue the operation of the MMC with the other normal current detectors provided at the same location (see, for example, Japanese Patent Laying-Open No. 2017-103919 (PTL 1), paragraph [0034]).

CITATION LIST

Patent Literature

PTL 1: Japanese Patent Laying-Open No. 2017-103919

SUMMARY OF INVENTION

Technical Problem

In the conventional technique as described above, a plurality of current detectors need to be installed at the same location in order to detect the presence or absence of failure of current detectors, and this leads to cost increase.

The present disclosure is made in view of the problem above and one of the objects is to provide an MMC-type power conversion device capable of failure determination of each current detector even when one current detector is provided at the same location. Another object of the present disclosure is to provide an MMC-type power conversion device capable of identifying a failed current detector and continuing operation with the other normal current detector provided at the same location even when two current detectors are provided at the same location.

Solution to Problem

A power conversion device of an embodiment is a modular multilevel converter-type power conversion device including a positive electrode-side DC line, a negative electrode-side DC line, n AC lines (where n is an integer equal to or greater than two), n upper arms, n lower arms, n upper arm current detectors, n lower arm current detectors, and a first failure detection unit. The n upper arms respectively correspond to the n AC lines and each has one end connected to the positive electrode-side DC line and the other end electrically connected to the corresponding AC line. Each upper arm includes a plurality of converter cells connected in cascade. The n lower arms respectively correspond to the n upper arms and each has one end connected to the negative electrode-side DC line and the other end connected to the other end of the corresponding upper arm. Each lower arm includes a plurality of converter cells connected in cascade. The n upper arm current detectors are respectively provided in the n upper arms. The n lower arm current detectors are respectively provided in the n lower arms. The first failure detection unit detects presence or absence of failure of each of the n upper arm current detectors and the n lower arm current detectors. The first failure detection unit includes a first determination unit, a second determination unit, a third determination unit, and a fourth determination unit. The first determination unit makes a determination based on comparison between a sum of detection values of the n upper arm current detectors and a sum of detection values of the n lower arm current detectors. The second determination unit makes a determination based on comparison between a detection value or a command value of current flowing through the positive electrode-side DC line and a sum of detection values of the n upper arm current detectors. The third determination unit makes a determination based on comparison between a current value or a command value of current flowing through the negative electrode-side DC line and a sum of detection values of the n lower arm current detectors. The fourth determination unit makes a determination based on comparison of a sum of a detection value of an upper arm current detector provided in any given first upper arm and a detection value of a lower arm current detector provided in a lower arm corresponding to the first upper arm with a sum of a detection value of an upper arm current detector provided in another second upper arm and a detection value of a lower arm current detector provided in a lower arm corresponding to the second upper arm, or comparison of a difference between a detection value of an upper arm current detector provided in any given first upper arm and a detection value of a lower arm current detector provided in a lower arm corresponding to the first upper arm with a detection value of AC current on an AC line corresponding to the first upper arm.

A power conversion device of another embodiment is a modular multilevel converter-type power conversion device including a positive electrode-side DC line, a negative electrode-side DC line, n AC lines (where n is an integer equal to or greater than two), n upper arms, n lower arms, n first upper arm current detectors, n second upper arm current detectors, n first lower arm current detectors, n second lower arm current detectors, and a first failure detection unit. The n upper arms respectively correspond to the n AC lines and each has one end connected to the positive electrode-side DC line and the other end electrically connected to the corresponding AC line. Each upper arm includes a plurality of converter cells connected in cascade. The n lower arms respectively correspond to the n upper arms and each has one end connected to the negative electrode-side DC line and the other end connected to the other end of the corresponding upper arm. Each lower arm includes a plurality of converter cells connected in cascade. The n first upper arm current detectors are respectively provided in the n upper arms. The n second upper arm current detectors are respectively provided in the n upper arms. The n first lower arm current detectors are respectively provided in the n lower arms. The n second lower arm current detectors are respectively provided in the n lower arms. The first failure detection unit detects presence or absence of failure of each current detector, for the n first upper arm current detectors, the n second upper arm current detectors, the n first lower arm current detectors, and the n second lower arm current detectors. The first failure detection unit includes a first determination unit, a second determination unit, a third determination unit, and a fourth determination unit. The first determination unit makes a determination based on comparison between a detection value of a first upper arm current detector and a detection value of a second upper arm current detector installed in a same upper arm. The second determination unit make a determination based on comparison between a detection value of a first lower arm current detector and a detection value of a second lower arm current detector installed in a same lower arm. The third determination unit makes a determination based on comparison between a sum of detection values of the n first upper arm current detectors and detection values of the n first lower arm current detectors. The fourth determination unit makes a determination based on comparison between a sum of detection values of the n second upper arm current detectors and detection values of the n second lower arm current detectors.

Advantageous Effects of Invention

In the power conversion device of an embodiment, even when one current detector is provided at the same location, a failure determination of each current detector can be made based on a determination results of the first to fourth determination units. In the power conversion device of another embodiment, even when two current detectors are provided at the same location, a failed current detector can be identified based on determination results of the first to fourth determination units, and the operation of the power conversion device can be continued with the other normal current detector provided at the same location.

DESCRIPTION OF EMBODIMENTS

Figure 1:
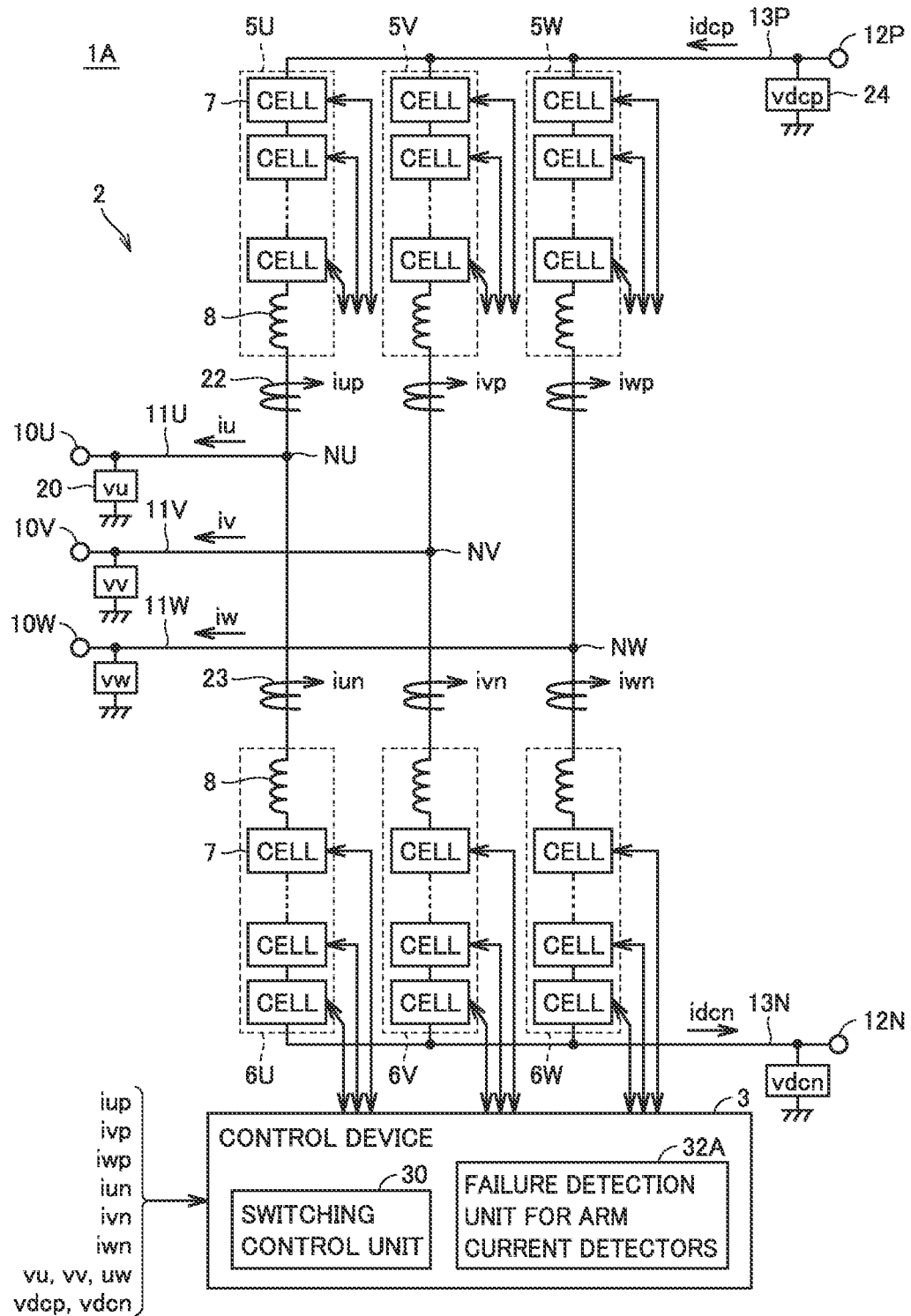
FIG. 1 is a schematic configuration diagram of a power conversion device of a first embodiment.

Embodiments of the present invention will be described in detail below with reference to the drawings. Like or corresponding parts in the drawings are denoted by like reference signs and a description thereof is not repeated.

First Embodiment

In first to third embodiments, a method capable of failure determination of each current detector when one current detector is provided at the same location will be described. Specifically, in the first embodiment, a current detector is provided in each arm but no current detector is provided on a DC line or an AC line.

In the following, a configuration of a power conversion device common in the first to sixth embodiments will be described first. Next, failure determination expressions for current detectors used in the first to third embodiments will be described. The failure determination expressions are conditional expressions for determining the presence or absence of failure of each current detector.

[Overall Configuration of Power Converter]

FIG. 1 is a schematic configuration diagram of a power conversion device of the first embodiment. Referring to FIG. 1, a power conversion device 1A is configured with a modular multilevel converter (MMC) including a plurality of converter cells 7 connected in series to each other. The "converter cell" may be referred to as "submodule", SM, or "unit converter".

Power conversion device 1A performs power conversion between a DC circuit (not shown) connected to a positive electrode-side DC terminal 12P and a negative electrode-side DC terminal 12N and an AC circuit (not shown) connected to U-phase, V-phase, and W-phase AC terminals 10U, 10V, and 10W. The DC circuit is a DC power system including a DC power grid or a DC terminal of any other power conversion device. In the latter case, two power conversion devices are coupled to form a back to back (BTB) system for connecting AC power systems having different rated frequencies. The AC circuit is, for example, an AC power system including an AC power source.

Power conversion device 1A includes a modular multilevel converter-type power converter 2 and a control device 3 that controls power converter 2.

Power converter 2 includes a positive electrode-side DC line 13P connected to positive electrode-side DC terminal 12P, a negative electrode-side DC line 13N connected to negative electrode-side DC terminal 12N, AC lines 11U, 11V, and 11W respectively connected to U-phase, V-phase, and W-phase AC terminals 10U, 10V, and 10W, U-phase, V-phase, and W-phase upper arms 5U, 5V, and 5W, and U-phase, V-phase, and W-phase lower arms 6U, 6V, and 6W. Upper arms 5U, 5V, and 5W correspond to lower arms 6U, 6V, and 6W, respectively, and are directly connected to lower arms 6U, 6V, and 6W through connection portions NU, NV, and NW, respectively.

Hereinafter, when positive electrode-side DC terminal 12P and negative electrode-side DC terminal 12N are collectively referred to or an unspecified one is referred to, they are referred to as DC terminal 12. When positive electrode-side DC line 13P and negative electrode-side DC line 13N are collectively referred to or an unspecified one is referred to, they are referred to as DC line 13. When AC terminals 10U, 10V, and 10W and AC lines 11U, 11V, and 11W are collectively referred to or an unspecified one is referred to, they are referred to as AC terminal 10 and AC line 11, respectively. When upper arms 5U, 5V, and 5W and lower arms 6U, 6V, and 6W are collectively referred to or an unspecified one is referred to, they are referred to as upper arm 5 and lower arm 6, respectively.

U-phase upper arm 5U has one end connected to positive electrode-side DC line 13P and the other end electrically connected to U-phase AC line 11U. Similarly, V-phase upper arm 5V has one end connected to positive electrode-side DC line 13P and the other end electrically connected to V-phase AC line 11V. W-phase upper arm 5W has one end connected to positive electrode-side DC line 13P and the other end electrically connected to W-phase AC line 11W.

U-phase lower arm 6U has one end connected to negative electrode-side DC line 13N and the other end connected to the other end of U-phase upper arm 5U through U-phase connection portion NU. Similarly, V-phase lower arm 6V has one end connected to negative electrode-side DC line 13N and the other end connected to the other end of V-phase upper arm 5V through V-phase connection portion NV. W-phase lower arm 6W has one end connected to negative electrode-side DC line 13N and the other end connected to the other end of W-phase upper arm 5W through W-phase connection portion NW.

In FIG. 1, the AC circuit is a three-phase AC system and three upper arms 5U, 5V, and 5W and three lower arms 6U, 6V, and 6W are provided corresponding to U phase, V phase, and W phase, respectively. Unlike FIG. 1, when the AC circuit is a single-phase AC system, two upper arms and two lower arms are provided. Therefore, more generally, n AC lines 11 (n is an integer equal to or greater than two) are respectively electrically connected to the other ends of n upper arms 5. The other ends of n lower arms 6 are respectively connected to the other ends of n upper arms 5.

A transformer (not shown) may be provided between the connection portion NU, NV, NW and AC terminal 10U, 10V, 10W. Alternatively, an interconnecting reactor (not shown) may be provided between the connection portion NU, NV, NW and U phase AC terminal 10U.

In FIG. 1, connection portions NU, NV, and NW are directly connected to AC lines 11U, 11V, and 11W, respectively. Unlike this, primary windings may be provided at connection portions NU, NV, and NW between upper arms 5U, 5V, 5W and lower arms 6U, 6V, 6W, so that connection portions NU, NV, and NW may be connected to AC lines 11U, 11V, and 11W, respectively, in terms of alternating current, through secondary windings magnetically coupled to the primary windings. In this case, the primary windings may be reactors 8 described below.

Upper arms 5U, 5V, and 5W have a configuration similar to each other and lower arms 6U, 6V, 6W have a configuration similar to each other. In the following, U-phase upper arm 5U and U-phase lower arm 6U will be described as a representative example.

U-phase upper arm 5U includes a plurality of converter cells 7 connected in cascade and a reactor 8. Converter cells 7 and reactor 8 are connected in series. Similarly, U-phase lower arm 6U includes a plurality of converter cells 7 connected in cascade and a reactor 8. Converter cells 7 and reactor 8 are connected in series. In the following description, the number of converter cells 7 included in each of U phase upper arm 5U and U-phase lower arm 6U is Ncell. Ncell is >2.

Reactor 8 may be inserted at any position in U-phase upper arm 5U and may be inserted at any position in U-phase lower arm 6U. A plurality of reactors 8 may be provided in each of U-phase upper arm 5U and U-phase lower arm 6U. The inductances of the reactors 8 may be different from each other. Only reactor 8 of U-phase upper arm 5U or only reactor 8 of U-phase lower arm 6U may be provided. When a transformer is provided on AC line 11U, 11V, 11W, the transformer connection may be adjusted to cancel the magnetic flux of DC component current, and leakage reactance of the transformer may act on AC component current as an alternative to the reactor. The provision of reactors 8 can suppress abrupt increase of fault current in faults in the AC circuit or the DC circuit.

Power conversion device 1A further includes AC voltage detectors 20, DC voltage detectors 24, upper arm current detectors 22, and lower arm current detectors 23, as detectors for measuring the quantity of electricity (current, voltage, etc.) to be used for control. Signals detected by these detectors are input to control device 3. The detectors will be specifically described below.

AC voltage detectors 20 are respectively provided for AC lines 11U, 11V, and 11W. AC voltage detectors 20 detect AC voltage vu on U-phase AC line 11U, AC voltage vv on V-phase AC line 11V, and AC voltage vw on W-phase AC line 11W. DC voltage detectors 24 are respectively provided for DC lines 13P and 13N. DC voltage detectors 24 detect DC voltage vdcp on positive electrode-side DC line 13P and DC voltage vdcn on negative electrode-side DC line 13N.

Upper arm current detector 22 are respectively provided for upper arms 5U, 5V, and 5W. Upper arm current detectors 22 detect upper arm current iup flowing through U-phase upper arm 5U, upper arm current ivp flowing through V-phase upper arm 5V, and upper arm current iwp flowing through W-phase upper arm 5W.

Lower arm current detectors 23 are respectively provided for lower arms 6U, 6V, and 6W. Lower arm current detectors 23 detect lower arm current iun flowing through U-phase lower arm 6U, lower arm current ivn flowing through V-phase lower arm 6V, and lower arm current iwn flowing through W-phase lower arm 6W.

In the following description, DC current flowing through positive electrode-side DC line 13P is denoted as idcp, and DC current flowing through negative electrode-side DC line 13N is denoted as idcn. DC current idcp is current flowing into upper arm 5U, 5V, 5W from the DC circuit or current flowing out to the DC circuit from upper arm 5U, 5V, 5W through positive electrode-side DC line 13P. DC current idcn is current flowing into lower arm 6U, 6V, 6W from the DC circuit or current flowing out to the DC circuit from lower arm 6U, 6V, 6W through negative electrode-side DC line 13N. In the second, third, fifth, and sixth embodiments, DC current detectors 25P and 25N are further provided for detecting DC currents idcp and idcn.

In the following description, AC current flowing through U-phase AC line 11U is denoted as iu, AC current flowing through V-phase AC line 11V is denoted as iv, and AC current flowing through W-phase AC line 11W is denoted as iw. In the third and sixth embodiments, AC current detectors 21 are further provided for detecting AC currents iu, iv, and iw.

[Configuration Example of Converter Cell]

Figure 2:
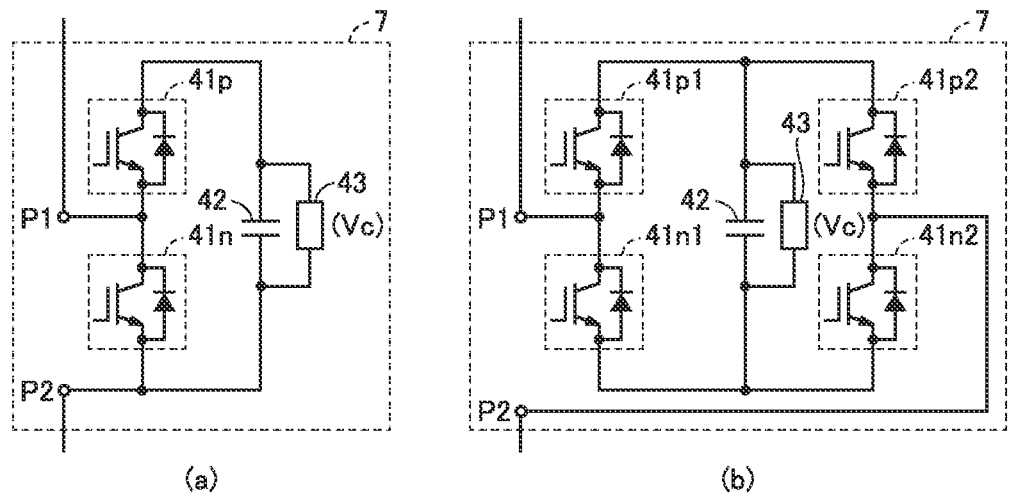
FIG. 2 is a circuit diagram showing a configuration example of a converter cell 7 that constitutes a power converter 2.

FIG. 2 is a circuit diagram showing a configuration example of converter cell 7 that constitutes power converter 2.

Converter cell 7 shown in FIG. 2(a) has a circuit configuration called half bridge configuration. This converter cell 7 includes a series of two switching elements 41p and 41n connected in series, a power storage element 42, a voltage detector 43, and input/output terminals P1 and P2. The series of switching elements 41p and 41n and power storage element 42 are connected in parallel. Voltage detector 43 detects voltage Vc between both ends of power storage element 42.

Both terminals of switching element 41n are connected to input/output terminals P1 and P2. With switching operation of switching elements 41p and 41n, converter cell 7 outputs voltage Vc of power storage element 42 or zero voltage between input/output terminals P1 and P2. When switching element 41p is turned ON and switching element 41n is turned OFF, voltage Vc of power storage element 42 is output from converter cell 7. When switching element 41p is turned OFF and switching element 41n is turned ON, converter cell 7 outputs zero voltage.

Converter cell 7 shown in FIG. 2(b) has a circuit configuration called full bridge configuration. This converter cell 7 includes a first series of two switching elements 41p1 and 41n1 connected in series, a second series of two switching elements 41p2 and 41n2 connected in series, a power storage element 42, a voltage detector 43, and input/output terminals P1 and P2. The first series, the second series, and power storage element 42 are connected in parallel. Voltage detector 43 detects voltage Vc between both ends of power storage element 42.

The middle point of switching element 41p1 and switching element 41n1 is connected to input/output terminal P1. Similarly, the middle point of switching element 41p2 and switching element 41n2 is connected to input/output terminal P2. With switching operation of switching elements 41p1, 41n1, 41p2, and 41n2, converter cell 7 outputs voltage Vc, −Vc of power storage element 42 or zero voltage between input/output terminals P1 and P2.

In FIG. 2(a) and FIG. 2(b), switching elements 41p, 41n, 41p1, 41n1, 41p2, and 41n2 are configured, for example, such that a freewheeling diode (FWD) is connected in anti-parallel with a self-turn-off semiconductor switching element such as an insulated gate bipolar transistor (IGBT) or a gate commutated turn-off (GCT) thyristor.

In FIG. 2(a) and FIG. 2(b), a capacitor such as a film capacitor is mainly used for power storage element 42. Power storage element 42 may hereinafter be called capacitor. In the following, voltage Vc of power storage element 42 may be referred to as capacitor voltage Vc.

As shown in FIG. 1, converter cells 7 are connected in cascade. In each of FIG. 2(a) and FIG. 2(b), in converter cell 7 arranged in U-phase upper arm 5U, input/output terminal P1 is connected to input/output terminal P2 of adjacent converter cell 7 or positive electrode-side DC line 13P, and input/output terminal P2 is connected to input/output terminal P1 of adjacent converter cell 7 or U-phase connection portion NU. Similarly, in converter cell 7 arranged in U-phase lower arm 6U, input/output terminal P1 is connected to input/output terminal P2 of adjacent converter cell 7 or U-phase connection portion NU, and input/output terminal P2 is connected to input/output terminal P1 of adjacent converter cell 7 or negative electrode-side DC line 13N.

In the following, converter cell 7 has the half bridge cell configuration shown in FIG. 2(a), and a semiconductor switching element is used as a switching element, and a capacitor is used as a power storage element, by way of example. However, converter cell 7 that constitutes power converter 2 may have the full bridge configuration shown in FIG. 2(b). A converter cell having a configuration other than those illustrated in the examples above, for example, a converter cell having a circuit configuration called clamped double cell may be used, and the switching element and the power storage element are also not limited to the examples above.

[Control Device]

Referring to FIG. 1 again, control device 3 functionally includes a switching control unit 30 and a failure detection unit 32A.

Switching control unit 30 controls the on and off of switching elements 41p and 41n of each converter cell 7, based on the detection values of AC voltage detectors 20, DC voltage detectors 24, arm current detectors 22 and 23, and voltage Vc of power storage element 42 provided in each converter cell 7. For simplicity of illustration, FIG. 1 shows only signal lines of signals input and output between control device 3 and each converter cell 7 and does not show signal lines of signals input from the other detectors to control device 3. Each signal line is formed with, for example, one or more optical fibers.

Failure detection unit 32A detects the presence or absence of each of arm current detectors 22 and 23. The operation of failure detection unit 32A will be described in detail later with reference to FIG. 4.

Figure 3:
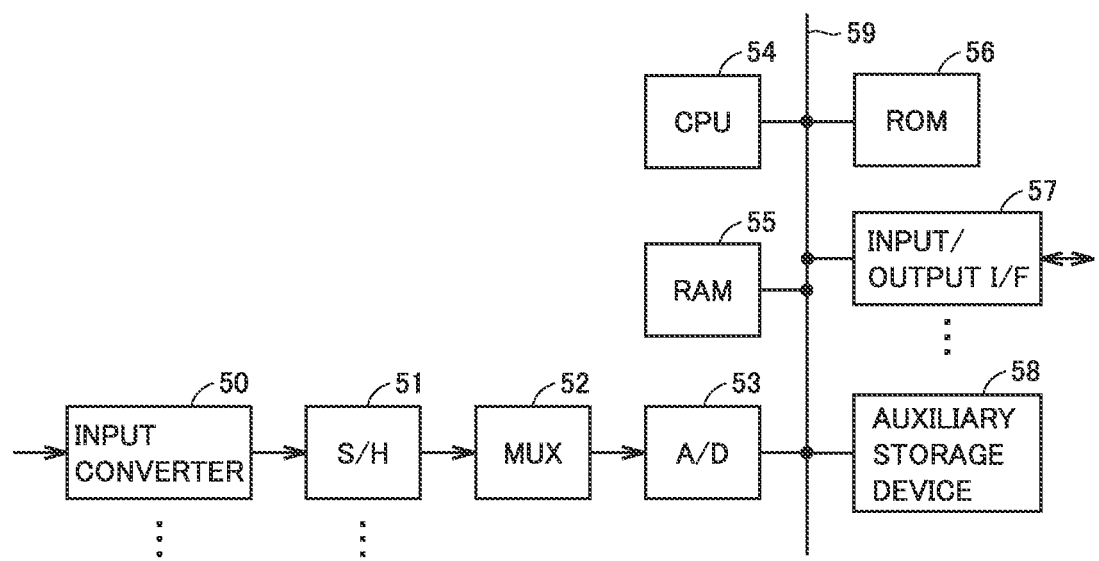
FIG. 3 is a block diagram showing a hardware configuration example of a control device.

FIG. 3 is a block diagram showing a hardware configuration example of the control device. FIG. 3 shows an example in which control device 3 is configured with a computer.

Referring to FIG. 3, control device 3 includes one or more input converters 50, one or more sample hold (S/H) circuits 51, a multiplexer (MUX) 52, and an A/D (analog to digital) converter 53. Control device 3 further includes one or more central processing units (CPU) 54, random access memory (RAM) 55, and read only memory (ROM) 56. Control device 3 further includes one or more input/output interfaces 57, an auxiliary storage device 58, and a bus 59 connecting the components above to each other.

Input converter 50 includes an auxiliary transformer (not shown) for each input channel. Each auxiliary transformer converts a detection signal from each electrical quantity detector in FIG. 1 into a signal having a voltage level suitable for subsequent signal processing.

Sample hold circuit 51 is provided for each input converter 50. Sample and hold circuit 51 samples and holds a signal representing the electrical quantity received from the corresponding input converter 50 at a predetermined sampling frequency.

Multiplexer 52 successively selects the signals held by a plurality of sample hold circuits 51. A/D converter 53 converts a signal selected by multiplexer 52 into a digital value. A plurality of A/D converters 53 may be provided to perform A/D conversion of detection signals of a plurality of input channels in parallel.

CPU 54 controls the entire control device 3 and performs computational processing under instructions of a program. RAM 55 as a volatile memory and ROM 56 as a nonvolatile memory are used as a main memory of CPU 54. ROM 56 stores a program and setting values for signal processing. Auxiliary storage device 58 is a nonvolatile memory having a larger capacity than ROM 56 and stores a program and data such as electrical quantity detection values.

Input/output interface 57 is an interface circuit for communication between CPU 54 and an external device.

Unlike the example in FIG. 3, at least a part of control device 3 may be configured using circuitry such as a field programmable gate array (FPGA) and an application specific integrated circuit (ASIC). That is, the function of each functional block illustrated in FIG. 3 may be configured based on the computer illustrated in FIG. 3 or may be at least partially configured with circuitry such as an FPGA and an ASIC. At least a part of the function of each functional block may be configured with an analog circuit.

[Failure Determination Expressions for Current Detectors]

Next, failure determination expressions for current detectors used in the first to third embodiments will be described. The failure determination expressions are conditional expressions for determining the presence or absence of failure of current detectors and based on Kirchhoff's first law (also referred to as current law), the current divider rule, the principle of three-phase alternating current, the control theory of power converters, and the like. In the first to third embodiments, the expressions selected from the following expressions (a2) to (k2) and (m2) are used as failure determination expressions.

(1) According to Kirchhoff's first law, the sum of currents iup, ivp, and iwp flowing through upper arms 5U, 5V, and 5W is equal to DC current idcp flowing through positive electrode-side DC line 13P. Therefore, $$idcp = iup + ivp + iwp$$

holds. Based on the above, the failure determination expression is written as $$|idcp - (iup + ivp + iwp)| > \varepsilon \tag{a2}.$$

|A| is the absolute value of A, and ε is a positive current threshold.

(2) According to Kirchhoff's first law, the sum of currents iun, ivn, and iwn flowing through lower arms 6U, 6V, and 6W is equal to DC current idcn flowing through negative electrode-side DC line 13N. Therefore, $$idcn = iun + ivn + iwn$$

holds. Based on the above, the failure determination expression is written as $$=idcn - (iun + ivn + iwn)| > \varepsilon \tag{b2}.$$

The current threshold ε in expression (b2) is not necessarily the same value as the current threshold ε in expression (a2). Similarly, the current threshold ε in the other failure determination expressions described later also are not necessarily the same value.

(3) According to the principle of three-phase alternating current, the sum of currents iu, iv, and iw of AC lines 11U, 11V, and 11W interconnected to the respective arms is zero. That is, $$iu + iv + iw = 0$$

holds. Therefore, for DC current idcp flowing through positive electrode-side DC line 13P and DC current idcn flowing through negative electrode-side DC line 13N, $$idcp - idcn = iu + iv + iw = 0$$

holds. Accordingly, DC current idcp is equal to DC current idcn. That is, $$idcp = idcn$$

holds. Therefore, the failure determination expression is written as $$|idcp - idcn| > \varepsilon \tag{c2}.$$

(4) Based on (1) to (3) above, the sum of currents iup, ivp, and iwp flowing through upper arms 5U, 5V, and 5W is equal to the sum of currents iun, ivn, and iwn flowing through lower arms 6U, 6V, and 6W. That is, $$iup + ivp + iwp = iun + ivn + iwn$$

holds. Therefore, the failure determination expression is written as $$|(iup + ivp + iwp) - (iun + ivn + iwn)| > \varepsilon \tag{d2}.$$

(5) According to Kirchhoff's first law, the difference between current iup of U-phase upper arm 5U and current iun of U-phase lower arm 6U interconnected to U-phase AC line 11U is equal to AC current iu of U-phase AC line 11U. This is the same with the V phase and the W phase. Therefore, $$iup - iun = iu, ivp - ivn = iv, \text{ and } iwp - iwn = iw$$

hold. When a transformer is provided on AC line 11U, 11V, 11W, the value of AC current iu, iv, iw is the value converted in terms of the connection portion NU, NV, NW. Therefore, the failure determination expressions are written as $$|iu - (iup - iun)| > \varepsilon \tag{e2}$$

$$|iv - (ivp - ivn)| > \varepsilon \tag{f2}$$

$$|iw - (iwp - iwn)| > \varepsilon \tag{g2}.$$

(6) The impedance of each arm portion of the MMC converter is equal. According to the control theory of converters, the series connection of upper arm 5 and lower arm 6 of each phase connecting positive electrode-side DC line 13P and negative electrode-side DC line 13N outputs a voltage equal to each other. Therefore, according to the current divider rule, the DC current components of upper arm 5 of the phases are evenly shared among the phases, and the DC current components of lower arm 6 of the phases is evenly shared among the phases. As a result, the sum of U-phase upper arm current iup and U-phase lower arm current iun, the sum of V-phase upper arm current ivp and V-phase lower arm current ivn, and the sum of W-phase upper arm current iwp and W-phase lower arm current iwn are equal to each other. That is, $$iup + iun = ivp + ivn = iwp + iwn = (2/3)idcp = (2/3)idcn$$

holds. Based on the above, the failure determination expressions are written as $$\uparrow(iup + iun) - (ivp + ivn)| > \varepsilon \tag{h2}$$

$$|(ivp + ivn) - (iwp + iwn)| > \varepsilon \tag{i2}$$

$$|(iwp + iwn) - (iup + iun)| > \varepsilon (j2).$$

However, when the sum of voltages of power storage elements 42 of converter cells 7 of each phase is imbalance among the phases, the circulating current component increases and the above expressions (h2), (i2), and (j2) do not hold. In such a case, in consideration of the circulating current component, the current threshold c is changed to ε' in accordance with ε'=ε+(10% of the rating of DC component of arm current).

Whether the circulating current component increases can be determined based on the comparison between the average values of power storage elements 42 of converter cells 7 of the phases. Specifically, the average value of voltages of power storage elements 42 of converter cells 7 in U-phase upper arm 5U and U-phase lower arm 6U is denoted as VcapU, the average value of voltages of power storage elements 42 of converter cells 7 in V-phase upper arm 5V and V-phase lower arm 6V is denoted as VcapV, and the average value of voltages of power storage elements 42 of converter cells 7 in W-phase upper arm 5W and W-phase lower arm 6W is denoted as VcapW. In this case, when the positive voltage threshold is εv, if one of the following determination expressions:

$$|VcapU-VcapV|>\varepsilon v$$

$$|VcapV-VcapW|>\varepsilon v$$

$$|VcapW-VcapU|>\varepsilon v$$

holds, the current threshold ε is changed to ε'.

(7) Based on the control theory of converters, when power converter 2 attains a steady state after being started, DC current command value idcref is equal to DC current DC current idcp, idcn flowing through DC line 13P, 13N. That is, $$idcref=idcp=idcn$$

holds. Furthermore, based on (1) and (2) above, the sum of currents iup, ivp, and iwp flowing through upper arms 5U, 5V, and 5W is equal to DC current idcp flowing through positive electrode-side DC line 13P, and the sum of currents iun, ivn, and iwn flowing through lower arms 6U, 6V, and 6W is equal to DC current idcn flowing through negative electrode-side DC line 13N. Therefore, $$idcref=iup+ivp+iwp=iun+ivn+iwn$$

holds. Based on the above, the failure determination expressions are written as $$|idcref-(iup+ivp+iwp)|>\varepsilon \quad (k2)$$

$$|idcref-(iun+ivn+iwn)|>\varepsilon \quad (m2).$$

However, these determination expressions (k2) and (m2) are masked until power converter 2 attains a steady state after being started. In the case of the MMC converter performing DC voltage control, since an error due to loss of the MMC converter occurs between the DC current command value and the DC current, correction is made in consideration of the error of the DC current.

[Operation of Failure Detection Unit 32A for Arm Current Detectors 22, 23]

The operation of failure detection unit 32A for arm current detectors 22 and 23 in power conversion device 1A in FIG. 1 will now be described.

Figure 4:
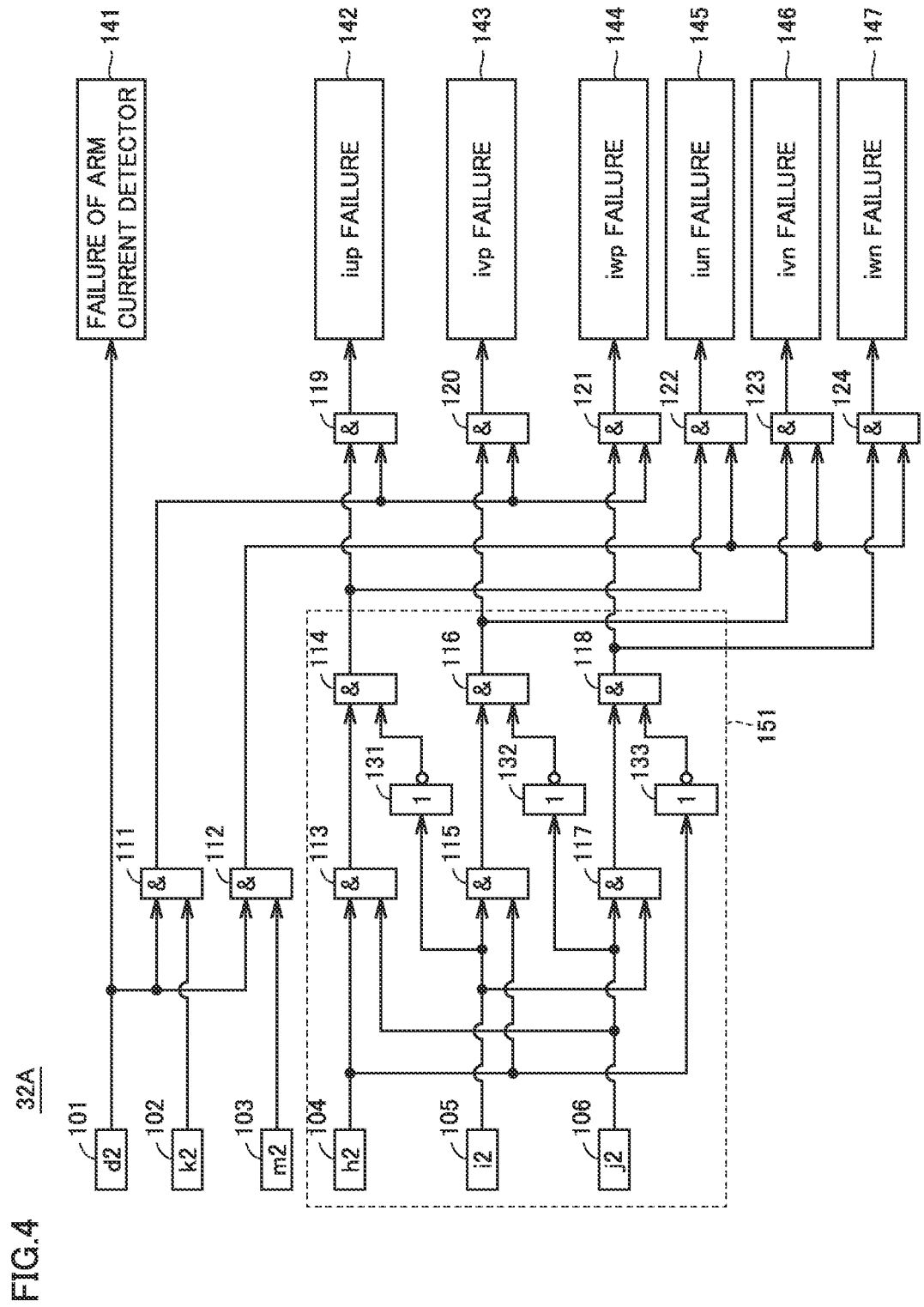
FIG. 4 is a functional block diagram of a failure detection unit that performs failure detection of arm current detectors in FIG. 1.

FIG. 4 is a functional block diagram of the failure detection unit that performs failure detection of arm current detectors in FIG. 1. Referring to FIG. 4, failure detection unit 32A includes an expression d2 determination unit 101, an expression k2 determination unit 102, an expression m2 determination unit 103, an expression h2 determination unit 104, an expression i2 determination unit 105, an expression j2 determination unit 106, AND operators 111 to 124, NOT operators 131 to 133, and determination result output units 141 to 147. The functions of these units are implemented, for example, by CPU 54 in FIG. 3 operating under instructions of a program.

Expression d2 determination unit 101 determines whether the expression (d2) holds, based on comparison between the sum of detection values of upper arm current detectors 22 of the phases and the sum of detection values of lower arm current detectors 23 of the phases. Hereinafter, when the logical value is "true", the outputs of the expression determination units and the operators are "1", and when the logical value is "false", the outputs of the expression determination units and the operators are "0". When the expression (d2) holds, that is, when the output of expression d2 determination unit 101 is "1", determination result output unit 141 outputs that one of arm current detectors 22 and 23 is failed.

Expression k2 determination unit 102 determines whether the expression (k2) holds based on comparison between DC current command value idcref and the sum of detection values of upper arm current detectors 22 of the phases. AND operator 111 performs AND operation of the output of expression d2 determination unit 101 and the output of expression k2 determination unit 102. Therefore, when the output of AND operator 111 is "1", one of upper arm current detectors 22 of the phases is failed.

Expression m2 determination unit 103 determines whether the expression (m2) holds based on comparison between DC current command value idcref and the sum of detection values of lower arm current detectors 23 of the phases. AND operator 112 performs AND operation of the output of expression d2 determination unit 101 and the output of expression m2 determination unit 103. Therefore, when the output of AND operator 112 is "1", one of lower arm current detectors 23 of the phases is failed.

Expression h2 determination unit 104 determines whether the expression (h2) holds, based on comparison between the sum of the detection value of U-phase upper arm current detector 22 and the detection value of U-phase lower arm current detector 23 and the sum of the detection value of V-phase upper arm current detector 22 and the detection value of V-phase lower arm current detector 23. Expression i2 determination unit 105 determines whether the expression (i2) holds, based on comparison between the sum of the detection value of V-phase upper arm current detector 22 and the detection value of V-phase lower arm current detector 23 and the sum of the detection value of W-phase upper arm current detector 22 and the detection value of W-phase lower arm current detector 23. Expression j2 determination unit 106 determines whether the expression (j2) holds, based on comparison between the sum of the detection value of W-phase upper arm current detector 22 and the detection value of W-phase lower arm current detector 23 and the sum of the detection value of U-phase upper arm current detector 22 and the detection value of U-phase lower arm current detector 23.

AND operator 113 performs AND operation of the output of expression h2 determination unit 104 and the output of expression j2 determination unit 106. AND operator 114 performs AND operation of the output of AND operator 113 and the negation of the output of expression i2 determination unit 105. Therefore, when the output of AND operator 114 is "1", one of U-phase upper arm current detector 22 or U-phase lower arm current detector 23 is failed.

AND operator 115 performs AND operation of the output of expression h2 determination unit 104 and the output of expression i2 determination unit 105. AND operator 116 performs AND operation of the output of AND operator 115 and the negation of the output of expression j2 determination unit 106. Therefore, when the output of AND operator 116 is "1", one of V-phase upper arm current detector 22 or V-phase lower arm current detector 23 is failed.

AND operator 117 performs AND operation of the output of expression i2 determination unit 105 and the output of expression j2 determination unit 106. AND operator 118 performs AND operation of the output of AND operator 117 and the negation of the output of expression h2 determination unit 104. Therefore, when the output of AND operator 118 is "1", one of W-phase upper arm current detector 22 or W-phase lower arm current detector 23 is failed.

AND operator 119 performs AND operation of the output of AND operator 111 and the output of AND operator 114. As the result, when the output of AND operator 119 is "1", determination result output unit 142 outputs that U-phase upper arm current detector 22 is failed (that is, the detection value of arm current iup is abnormal).

AND operator 120 performs AND operation of the output of AND operator 111 and the output of AND operator 116. As the result, when the output of AND operator 120 is "1", determination result output unit 143 outputs that V-phase upper arm current detector 22 is failed (that is, the detection value of arm current ivp is abnormal).

AND operator 121 performs AND operation of the output of AND operator 111 and the output of AND operator 118. As the result, when the output of AND operator 121 is "1", determination result output unit 144 outputs that W-phase upper arm current detector 22 is failed (that is, the detection value of arm current iwp is abnormal).

AND operator 122 performs AND operation of the output of AND operator 112 and the output of AND operator 114. As the result, when the output of AND operator 122 is "1", determination result output unit 145 outputs that U-phase lower arm current detector 23 is failed (that is, the detection value of arm current iun is abnormal).

AND operator 123 performs AND operation of the output of AND operator 112 and the output of AND operator 116. As the result, when the output of AND operator 123 is "1", determination result output unit 146 outputs that V-phase lower arm current detector 23 is failed (that is, the detection value of arm current ivn is abnormal).

AND operator 124 performs AND operation of the output of AND operator 112 and the output of AND operator 118. As the result, when the output of AND operator 124 is "1", determination result output unit 147 outputs that W-phase lower arm current detector 23 is failed (that is, the detection value of arm current iwn is abnormal). As described above, a failed detector among arm current detectors 22 and 23 of the phases can be identified.

Effects of First Embodiment

To sum up, in power conversion device 1A of the first embodiment, only arm current detectors 22 and 23 are provided as current detectors.

Control device 3 includes first failure detection unit 32A that detects the presence or absence of failure of each of n upper arm current detectors 22 and n lower arm current detectors 23. First failure detection unit 32A includes first determination unit (expression d2 determination unit) 101, second determination unit (expression k2 determination unit) 102, third determination unit (expression k3 determination unit) 103, and fourth determination unit 151 (expression h2 determination unit 104, expression i2 determination unit 105, expression j2 determination unit 106, AND operators 113 to 118, NOT operators 131 to 133). The determination principles of these determination units are based on Kirchhoff's current laws and the like.

Specifically, first determination unit 101 makes a determination based on comparison between the sum of detection values of n upper arm current detectors and the sum of detection values of n lower arm current detectors. Second determination unit 102 makes a determination based on comparison between command value idcref for current flowing through positive electrode-side DC line 13P and the sum of detection values of n upper arm current detectors 22. Third determination unit 103 makes a determination based on comparison between command value idcref for current flowing through negative electrode-side DC line 13N and the sum of detection values of n lower arm current detectors 23. Fourth determination unit 151 makes a determination based on comparison of the sum of the detection value of upper arm current detector 22 provided in any given first upper arm 5 and the detection value of lower arm current detector 23 provided in lower arm 6 corresponding to the first upper arm 5 with the sum of the detection value of upper arm current detector 22 provided in another second upper arm 5 and the detection value of lower arm current detector 23 provided in lower arm 6 corresponding to the second upper arm 5.

Whether a failure is occurring in an arm current detector can be determined from the determination result of first determination unit 101. Whether the failed arm current detector is on the positive electrode side or the negative electrode side can be determined from the determination results of second and third determination units 102 and 103. In which of U-phase, V-phase, and W-phase arms the failed arm current detector is provided can be determined from the determination result of fourth determination unit 104. Therefore, with the determination results of first to fourth determination units 101 to 104 altogether, which arm current detector is failed can be determined even when only one arm current detector is provided in each arm.

Second Embodiment

In the second embodiment, in addition to arm current detectors 22 and 23, DC current detectors 25P and 25N are further provided on DC lines 13P and 13N, respectively.

[Configuration of Power Conversion Device]

Figure 5:
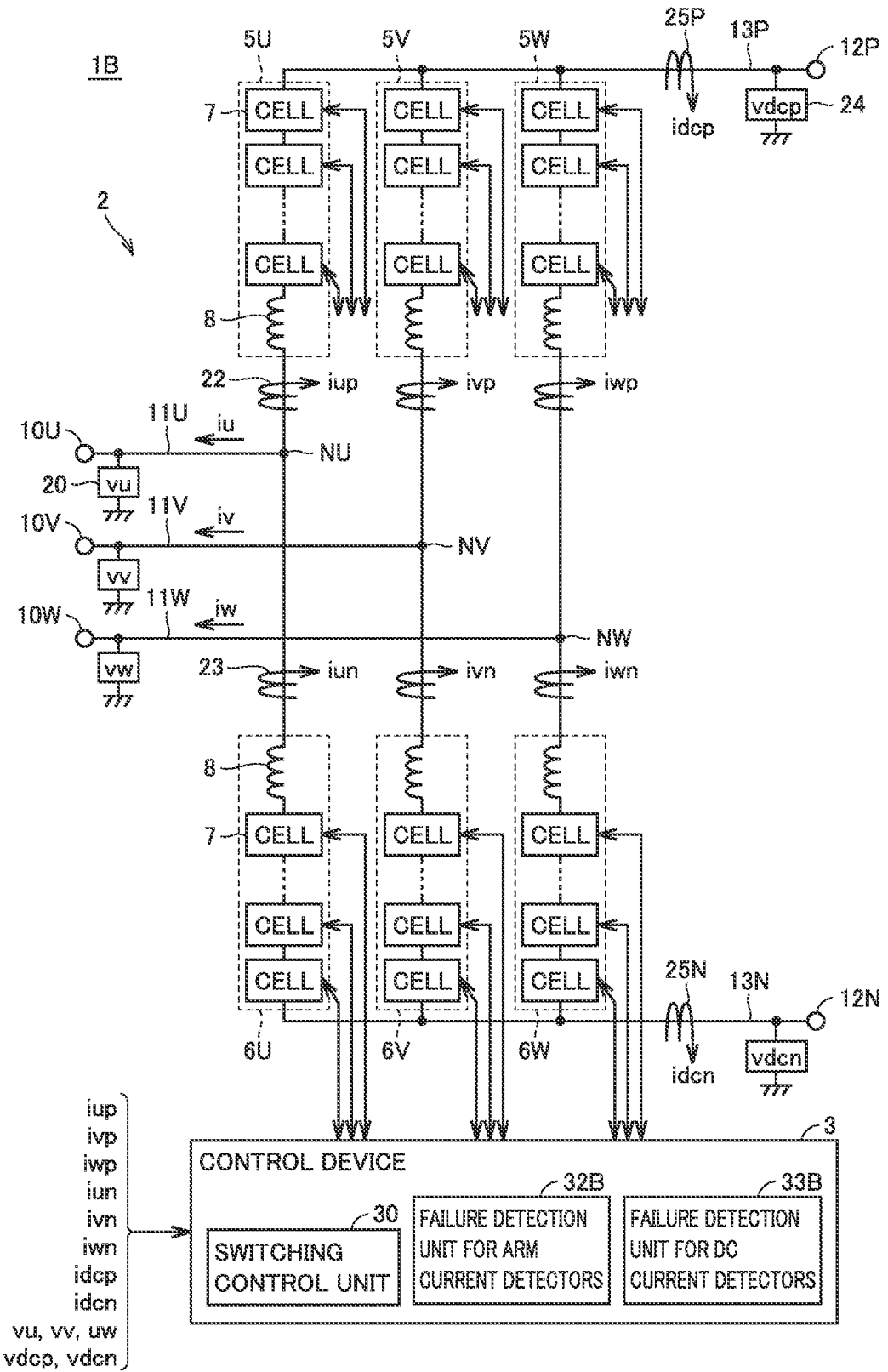
FIG. 5 is a schematic configuration diagram of a power conversion device of a second embodiment.

FIG. 5 is a schematic configuration diagram of a power conversion device of the second embodiment. A power conversion device 1B in FIG. 5 differs from power conversion device 1A in FIG. 1 in that it further includes DC current detectors 25P and 25N provided on DC lines 13P and 13N, respectively. DC current detector 25P (also referred to as positive electrode-side DC current detector) provided on positive electrode-side DC line 13P detects DC current idcp flowing into upper arms 5U, 5V, and 5W from the DC circuit or flowing out to the DC circuit from upper arms 5U, 5V, and 5W. DC current detector 25N (also referred to as negative electrode-side DC current detector) provided on negative electrode-side DC line 13N detects DC current idcn flowing into lower arms 6U, 6V, and 6W from the DC circuit or flowing out to the DC circuit from lower arms 6U, 6V, and 6W.

Furthermore, switching control unit 30 of control device 3 in FIG. 5 controls the switching of switching elements 41*p* and 41*n* of each converter cell 7, further based on the values of DC currents idcp and idcn detected by DC current detectors 25P and 25N.

Control device 3 in FIG. 5 differs from control device 3 in FIG. 1 in that it includes a failure detection unit 32B for arm current detectors 22 and 23 as well as a failure detection unit 33B that detects the presence or absence of failure of each of DC current detectors 25P and 25N. In other respects, FIG. 5 is similar to FIG. 1, and the same or corresponding parts are denoted by the same reference signs and will not be further elaborated.

[Operation of Failure Detection Unit 33B for DC Current Detectors 25P, 25N]

The operation of failure detection unit 33B for DC current detectors 25P and 25N installed on DC lines 13P and 13N will now be described. The determination expressions selected from the failure determination expressions described in the first embodiment are used as failure determination expressions.

Figure 6:
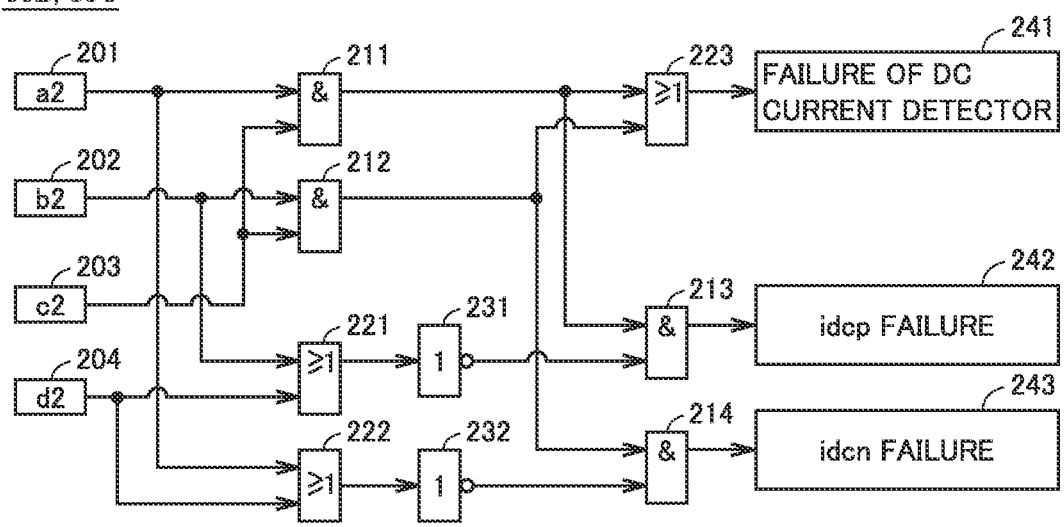
FIG. 6 is a functional block diagram of a failure detection unit that performs failure detection of DC current detectors in FIG. 5.

FIG. 6 is a functional block diagram of the failure detection unit that performs failure detection of DC current detectors in FIG. 5. Referring to FIG. 6, failure detection unit 33B includes an expression a2 determination unit 201, an expression b2 determination unit 202, an expression c2 determination unit 203, an expression d2 determination unit 204, AND operators 211 to 214, OR operators 221 to 223, NOT operators 231 and 232, and determination result output units 241 to 243. The functions of these units are implemented, for example, by CPU 54 in FIG. 3 operating under instructions of a program.

Expression a2 determination unit 201 determines whether the expression (a2) holds, based on comparison between the detection value of DC current detector 25P provided on positive electrode-side DC line 13P and the sum of detection values of upper arm current detectors 22 of the phases.

Expression b2 determination unit 202 determines whether the expression (b2) holds, based on comparison between the detection value of DC current detector 25N provided on negative electrode-side DC line 13N and the sum of detection values of lower arm current detectors 23 of the phases.

Expression c2 determination unit 203 determines whether the expression (c2) holds, based on comparison between the detection value of DC current detector 25P provided on positive electrode-side DC line 13P and the detection value of DC current detector 25N provided on negative electrode-side DC line 13N. Therefore, when the output of expression c2 determination unit 203 is "1", it is indicated that DC current detector 25P, 25N provided on one of DC lines 13P and 13N is failed.

Expression d2 determination unit 204 determines whether the expression (d2) holds, based on comparison between the sum of detection values of upper arm current detectors 22 of the phases and the sum of detection values of lower arm current detectors 23 of the phases. Therefore, when the output of expression d2 determination unit 204 is "1", it is indicated that one of upper arm current detector 22 and lower arm current detector 23 is failed.

AND operator 211 performs AND operation of the output of expression a2 determination unit 201 and the output of expression c2 determination unit 203. AND operator 212 performs AND operation of the output of expression b2 determination unit 202 and the output of expression c2 determination unit 203. OR operator 223 performs OR operation of the output of AND operator 211 and the output of AND operator 212. When the output of OR operator 223 is "1", determination result output unit 241 outputs that one of DC current detectors 25P and 25N provided on DC lines 13P and 13N is failed.

OR operator 221 performs OR operation of the output of expression b2 determination unit 202 and the output of expression d2 determination unit 204. NOT operator 231 performs NOT operation of the output of OR operator 221. Therefore, when the output of NOT operator 231 is "1", it is indicated that both of the outputs of expression b2 determination unit 202 and expression d2 determination unit 204 are "0", that is, neither the expression (b2) nor the expression (d2) holds.

AND operator 213 performs AND operation of the output of AND operator 211 and the output of NOT operator 231. When the output of AND operator 213 is "1", determination result output unit 242 outputs that DC current detector 25P provided on positive electrode-side DC line 13P is failed (that is, the detection value of DC current idcp is abnormal).

OR operator 222 performs OR operation of the output of expression a2 determination unit 201 and the output of expression d2 determination unit 204. NOT operator 232 performs NOT operation of the output of OR operator 222. Therefore, when the output of NOT operator 232 is "1", it is indicated that both of the outputs of expression a2 determination unit 201 and expression d2 determination unit 204 are "0", that is, neither the expression (a2) nor the expression (d2) holds.

AND operator 214 performs AND operation of the output of AND operator 212 and the output of NOT operator 232. When the output of AND operator 214 is "1", determination result output unit 243 outputs that DC current detector 25N provided on negative electrode-side DC line 13N is failed (that is, the detection value of DC current idcn is abnormal).

[Operation of Failure Detection Unit 32B for Arm Current Detectors 22, 23]

The operation of failure detection unit 32B for arm current detectors 22 and 23 in power conversion device 1B in FIG. 5 will now be described.

Figure 7:
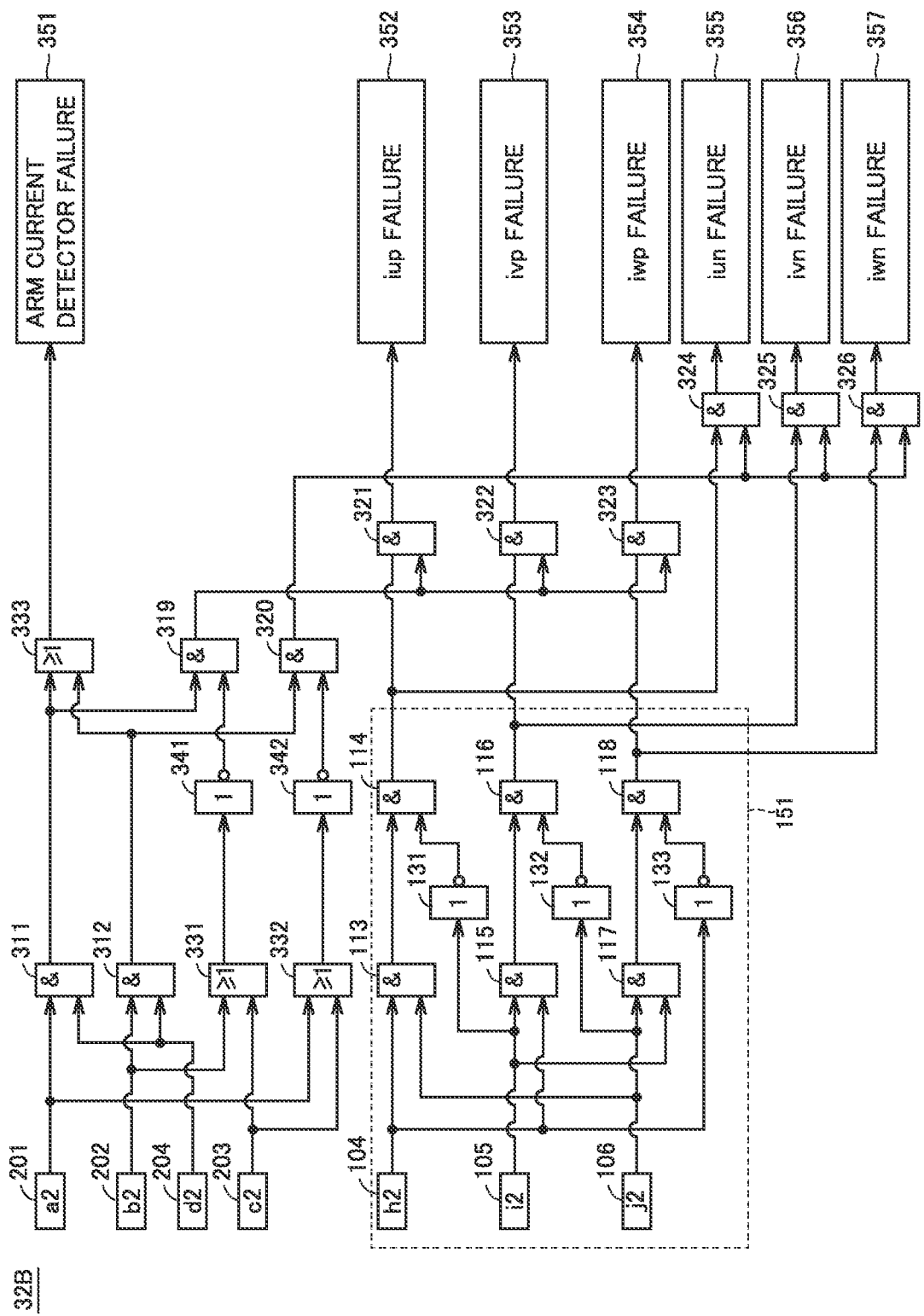
FIG. 7 is a functional block diagram of a failure detection unit that performs failure detection of arm current detectors in FIG. 5.

FIG. 7 is a functional block diagram of the failure detection unit that performs failure detection of arm current detectors in FIG. 5. Referring to FIG. 7, failure detection unit 32B includes an expression a2 determination unit 201, an expression b2 determination unit 202, an expression d2 determination unit 204, an expression c2 determination unit 203, an expression h2 determination unit 104, an expression i2 determination unit 105, an expression j2 determination unit 106, AND operators 113 to 118, 311, 312, and 319 to 326, OR operators 331 to 333, NOT operators 341, 342, and 131 to 133, and determination result output units 351 to 357. The functions of these units are implemented, for example, by CPU 54 in FIG. 3 operating under instructions of a program.

Expression a2 determination unit 201, expression b2 determination unit 202, expression d2 determination unit 204, and expression c2 determination unit 203 in FIG. 7 respectively correspond to expression a2 determination unit 201, expression b2 determination unit 202, expression d2 determination unit 204, and expression c2 determination unit 203 in FIG. 6. Therefore, the description thereof will not be repeated.

AND operator 311 performs AND operation of the output of expression a2 determination unit 201 and the output of expression d2 determination unit 204. AND operator 312 performs AND operation of the output of expression b2 determination unit 202 and the output of expression d2 determination unit 204. OR operator 333 performs OR operation of the output of AND operator 311 and the output of AND operator 312. When the output of OR operator 333 is "1", determination result output unit 351 outputs that one of upper arm current detector 22 or lower arm current detector 23 is failed.

OR operator 331 performs OR operation of the output of expression b2 determination unit 202 and the output of expression c2 determination unit 203. NOT operator 341 performs NOT operation of the output of OR operator 331. Therefore, when the output of NOT operator 341 is "1", it is indicated that both of the outputs of expression b2 determination unit 202 and expression c2 determination unit 203 are "0", that is, neither the expression (b2) nor the expression (c2) holds.

AND operator 319 performs AND operation of the output of AND operator 311 and the output of NOT operator 341. When the output of AND operator 313 is "1", it is indicated that one of U-phase, V-phase, and W-phase upper arm current detectors 22 is failed.

OR operator 332 performs OR operation of the output of expression a2 determination unit 201 and the output of expression c2 determination unit 203. NOT operator 342 performs NOT operation of the output of OR operator 332. Therefore, when the output of NOT operator 332 is "1", it is indicated that both of the outputs of expression a2 determination unit 201 and expression c2 determination unit 203 are "0", that is, neither the expression (a2) nor the expression (c2) holds.

AND operator 320 performs AND operation of the output of AND operator 312 and the output of NOT operator 342. When the output of AND operator 320 is "1", it is indicated that one of U-phase, V-phase, and W-phase lower arm current detectors 23 is failed.

Expression h2 determination unit 104, expression i2 determination unit 105, and expression j2 determination unit 106 in FIG. 7 respectively correspond to expression h2 determination unit 104, expression i2 determination unit 105, and expression j2 determination unit 106 in FIG. 4. Therefore, the description thereof will not be repeated.

Furthermore, a unit 151 composed of expression determination units 104 to 106, AND operators 113 to 118, and NOT operators 131 to 133 in FIG. 7 corresponds to a unit 151 composed of expression determination units 104 to 106, AND operators 113 to 118, and NOT operators 131 to 133 in FIG. 4. Therefore, the description thereof will not be repeated.

Therefore, when the output of AND operator 114 is "1", it is indicated that one of U-phase upper arm current detector 22 or U-phase lower arm current detector 23 is failed. When the output of AND operator 116 is "1", it is indicated that one of V-phase upper arm current detector 22 or V-phase lower arm current detector 23 is failed. When the output of AND operator 118 is "1", it is indicated that one of W-phase upper arm current detector 22 or W-phase lower arm current detector 23 is failed.

Based on the above, the operation of AND operators 321 to 326 and determination result output units 352 to 357 will be described.

AND operator 321 performs AND operation of the output of AND operator 319 and the output of AND operator 114. As the result, when the output of AND operator 321 is "1", determination result output unit 352 outputs that U-phase upper arm current detector 22 is failed (that is, the detection value of arm current iup is abnormal).

AND operator 322 performs AND operation of the output of AND operator 319 and the output of AND operator 116. As the result, when the output of AND operator 322 is "1", determination result output unit 353 outputs that V-phase upper arm current detector 22 is failed (that is, the detection value of arm current ivp is abnormal).

AND operator 323 performs AND operation of the output of AND operator 319 and the output of AND operator 118. As the result, when the output of AND operator 323 is "1", determination result output unit 354 outputs that W-phase upper arm current detector 22 is failed (that is, the detection value of arm current iwp is abnormal).

AND operator 324 performs AND operation of the output of AND operator 320 and the output of AND operator 114. As the result, when the output of AND operator 324 is "1", determination result output unit 355 outputs that U-phase lower arm current detector 23 is failed (that is, the detection value of arm current iun is abnormal).

AND operator 325 performs AND operation of the output of AND operator 320 and the output of AND operator 116. As the result, when the output of AND operator 325 is "1", determination result output unit 356 outputs that V-phase lower arm current detector 23 is failed (that is, the detection value of arm current ivn is abnormal).

AND operator 326 performs AND operation of the output of AND operator 320 and the output of AND operator 118. As the result, when the output of AND operator 326 is "1", determination result output unit 357 outputs that W-phase lower arm current detector 23 is failed (that is, the detection value of arm current iwn is abnormal). As described above, a failed detector among arm current detectors 22 and 23 of the phases can be identified.

Effects of Second Embodiment

To sum up, in power conversion device 1B of the second embodiment, arm current detectors 22 and 23 and DC current detectors 25P and 25N installed on DC lines 13P and 13N are provided as current detectors. Control device 3 includes first failure detection unit 32B that detects the presence or absence of failure of each current detector for n upper arm current detectors 22 and n lower arm current detectors 23, and second failure detection unit 33B that detects the presence or absence of failure of each of DC current detectors 25P and 25N.

First failure detection unit 32B includes first determination unit (expression d2 determination unit) 204, second determination unit (expression a2 determination unit) 201, third determination unit (expression b2 determination unit) 202, and fourth determination unit 151 (expression h2 determination unit 104, expression i2 determination unit 105, expression j2 determination unit 106, AND operators 113 to 118, NOT operators 131 to 133). Fourth determination unit 151 is the same as in the first embodiment.

First determination unit 204 is the same as first determination unit 101 in the first embodiment and makes a determination based on comparison between the sum of detection values of n upper arm current detectors and the sum of detection values of n lower arm current detectors. Second determination unit 202 makes a determination based on the detection value of positive electrode-side DC current detector 25P and the sum of detection values of n upper arm current detectors 22. Third determination unit 202 makes a determination based on comparison between the detection value of negative electrode-side DC current detector 25N and the sum of detection values of n lower arm current detectors 23. With the determination results of first to fourth determination units 201, 202, 204, and 151 altogether, which arm current detector is failed can be determined even when only one arm current detector is provided in each arm.

First failure detection unit 32A in the first embodiment and first failure detection unit 32B in the second embodiment will now be compared. Failure detection unit 32A compares DC current command value idcref with the sum of detection values of upper arm current detectors 22 of the phases and compares DC current command value idcref with the sum of detection values of lower arm current detectors 23 of the phases. On the other hand, failure detection unit 32B compares the detection value of DC current detector 25P installed on positive electrode-side DC line 13P with the sum of detection values of upper arm current detectors 22 of the phases, and compares the detection value of DC current detector 25N installed on negative electrode-side DC line 13N with the sum of detection values of lower arm current detectors 23 of the phases. Therefore, failure detection unit 32B in the second embodiment can determine the presence or absence of failure of a current detector using failure determination expressions with fewer errors.

Second failure detection unit 33B includes first determination unit (expression d2 determination unit) 204, second determination unit (expression a2 determination unit 201, third determination unit (expression b2 determination unit) 202 described above, and fifth determination unit (expression c2 determination unit) 203. Fifth determination unit 203 makes a determination based on comparison between the detection value of positive electrode-side DC current detector 25P and the detection value of negative electrode-side DC current detector 25N.

With the determination results of first to third and fifth determination units 201 to 204 altogether, which DC current detector 25P or 25N is failed can be determined even when only one DC current detector is provided on each DC line.

Third Embodiment

In the third embodiment, in addition to arm current detectors 22 and 23 and DC current detectors 25P and 25N installed on DC lines 13P and 13N, AC current detectors 21 are further provided on AC lines 11U, 11V, and 11W.

[Configuration of Power Conversion Device]

Figure 8:
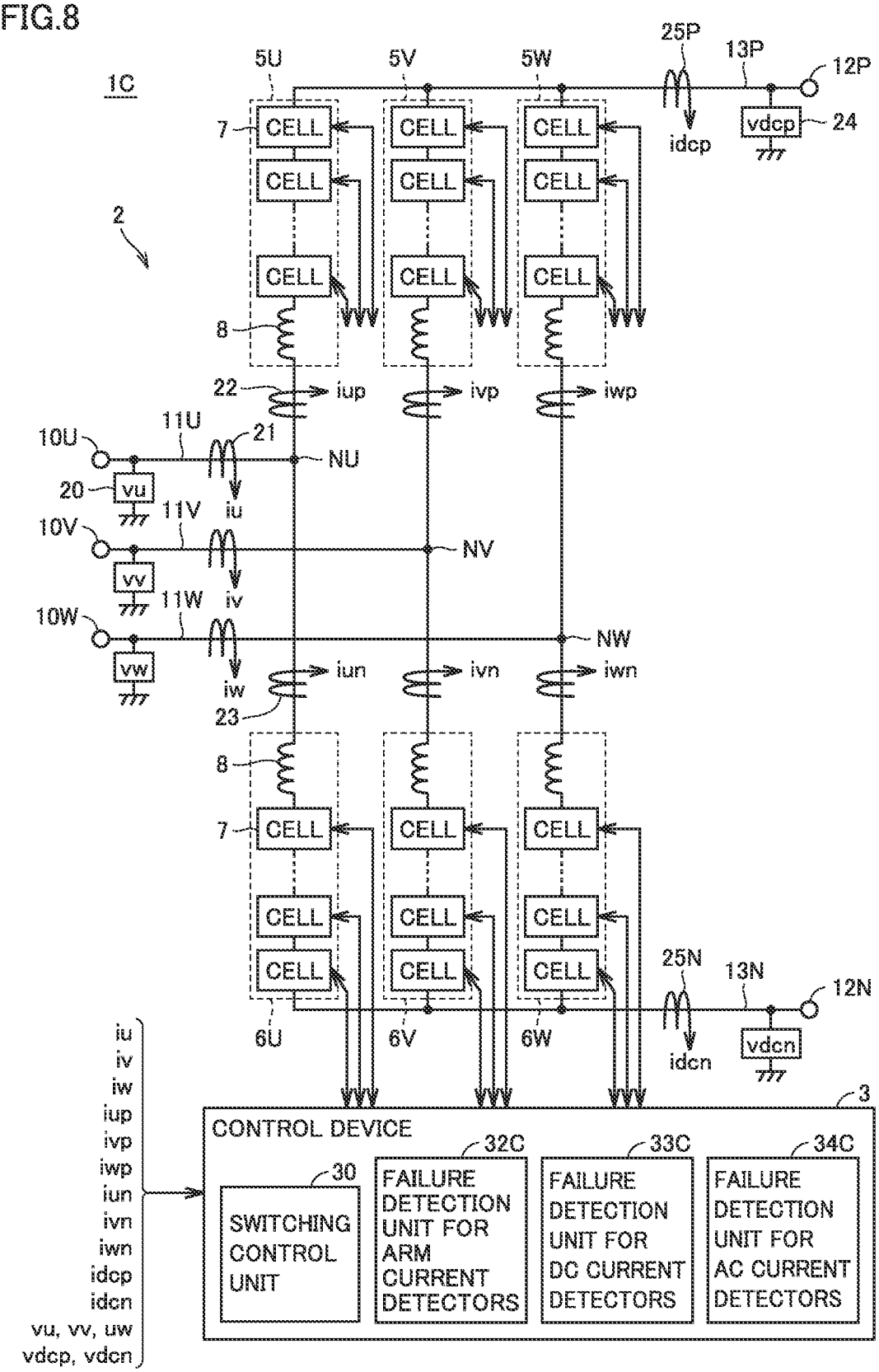
FIG. 8 is a schematic configuration diagram of a power conversion device of a third embodiment.

FIG. 8 is a schematic configuration diagram of a power conversion device of the third embodiment. Power conversion device 1C in FIG. 8 differs from power conversion device 1B in FIG. 5 in that it further includes AC current detectors 21 respectively provided on AC lines 11U, 11V, and 11W. AC current detector 21 provided on U-phase AC line 11U detects U-phase AC current iu. AC current detector 21 provided on V-phase AC line 11V detects V-phase AC current iv. AC current detector 21 provided on W-phase AC line 11W detects W-phase AC current iw.

Furthermore, switching control unit 30 of control device 3 in FIG. 8 controls the switching of switching elements 41p and 41n of each converter cell 7, further based on the values of AC currents iu, iv, and iw detected by AC current detectors 21.

Control device 3 in FIG. 8 differs from control device 3 in FIG. 5 in that it includes a failure detection unit 32C for arm current detectors 22 and 23 and a failure detection unit 33C for DC current detectors 25P and 25N, as well as a failure detection unit 34C that detects the presence or absence of failure of each AC current detector 21. In other respects, FIG. 8 is similar to FIG. 1 and FIG. 5, and the same or corresponding parts are denoted by the same reference signs and will not be further elaborated.

[Operation of Failure Detection Unit 34C for AC Current Detector 21]

The operation of failure detection unit 34C that performs failure detection of

AC current detectors 21 installed on AC lines 11U, 11V, and 11W will now be described. The determination expressions used in failure detection unit 34C are selected from the failure determination expressions described in the first embodiment.

Figure 9:
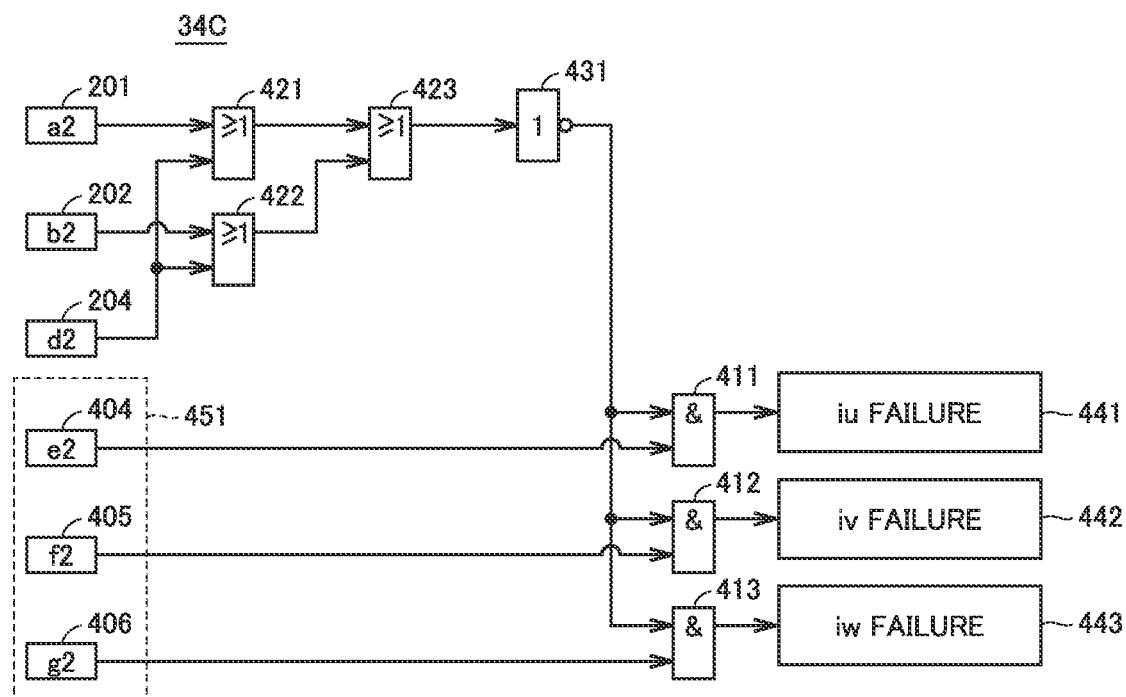
FIG. 9 is a functional block diagram of a failure detection unit that performs failure detection of AC current detectors in FIG. 8.

FIG. 9 is a functional block diagram of the failure detection unit that performs failure detection of AC current detectors in FIG. 8. Referring to FIG. 9, failure detection unit 34C includes an expression a2 determination unit 201, an expression b2 determination unit 202, an expression d2 determination unit 204, an expression e2 determination unit 404, an expression f2 determination unit 405, an expression g2 determination unit 406, AND operators 411 to 413, OR operators 421 to 423, a NOT operator 431, and determination result output units 441 to 443. The functions of these units are implemented, for example, by CPU 54 in FIG. 3 operating under instructions of a program.

Expression a2 determination unit 201, expression b2 determination unit 202, and expression d2 determination unit 204 respectively correspond to expression a2 determination unit 201, expression b2 determination unit 202, and expression d2 determination unit 204 in FIG. 6 and will not be further elaborated.

Expression e2 determination unit 404 determines whether the expression (e2) holds, based on comparison between the value obtained by subtracting the detection value of U-phase lower arm current detector 23 from the detection value of U-phase upper arm current detector 22, and the detection value of U-phase AC current detector 21. When the output of expression e2 determination unit 404 is "1", it is indicated that one of U-phase upper arm current detector 22, U-phase lower arm current detector 23, and U-phase AC current detector 21 is failed.

Expression f2 determination unit 405 determines whether the expression (f2) holds, based on comparison between the value obtained by subtracting the detection value of V-phase lower arm current detector 23 from the detection value of V-phase upper arm current detector 22, and the detection value of V-phase AC current detector 21. When the output of expression f2 determination unit 405 is "1", it is indicated that one of V-phase upper arm current detector 22, V-phase lower arm current detector 23, and V-phase AC current detector 21 is failed.

Expression g2 determination unit 406 determines whether the expression (g2) holds, based on comparison between the value obtained by subtracting the detection value of W-phase lower arm current detector 23 from the detection value of W phase upper arm current detector 22, and the detection value of W-phase AC current detector 21. When the output of expression g2 determination unit 406 is "1", it is indicated that one of W-phase upper arm current detector 22, W-phase lower arm current detector 23, and W-phase AC current detector 21 is failed.

OR operator 421 performs OR operation of the output of expression a2 determination unit 201 and the output of expression d2 determination unit 204. OR operator 422 performs OR operation of the output of expression b2 determination unit 202 and the output of expression d2 determination unit 204. OR operator 423 performs OR operation of the output of OR operator 421 and the output of OR operator 422. NOT operator 431 performs NOT operation of the output of OR operator 423. Therefore, when the operation result of NOT operator 431 is "1", it is indicated that none of the expression (a2), the expression (b2), and the expression (d2) hold, that is, none of arm current detectors 22 and 23 and DC current detectors 25P and 25N are failed.

Based on the above, the operation of AND operators 411 to 413 and determination result output units 441 to 443 will be described.

AND operator 411 performs AND operation of the output of NOT operator 431 and the output of expression e2 determination unit 404. As the result, when the output of AND operator 411 is "1", determination result output unit 441 outputs that U-phase AC current detector 21 is failed (that is, the detection value of AC current iu is abnormal).

AND operator 412 performs AND operation of the output of NOT operator 431 and the output of expression f2 determination unit 405. As the result, when the output of AND operator 412 is "1", determination result output unit 442 outputs that V-phase AC current detector 21 is failed (that is, the detection value of AC current iv is abnormal).

AND operator 413 performs AND operation of the output of NOT operator 431 and the output of expression g2 determination unit 406. As the result, when the output of AND operator 413 is "1", determination result output unit 443 outputs that W-phase AC current detector 21 is failed (that is, the detection value of AC current iw is abnormal). As described above, a failed current detector among AC current detectors 21 provided on AC lines 11U, 11V, and 11W can be specified.

[Operation of Failure Detection Unit 33C for DC current detectors 25P, 25N]

The functional block diagram of failure detection unit 33B illustrated in FIG. 6 can be used as the functional block diagram of failure detection unit 33C in FIG. 8.

[Operation of Failure Detection Unit 32C for Arm Current Detectors 22, 23]

The operation of failure detection unit 32C for arm current detectors 22 and 23 in power conversion device 1C in FIG. 8 will now be described.

Figure 10:
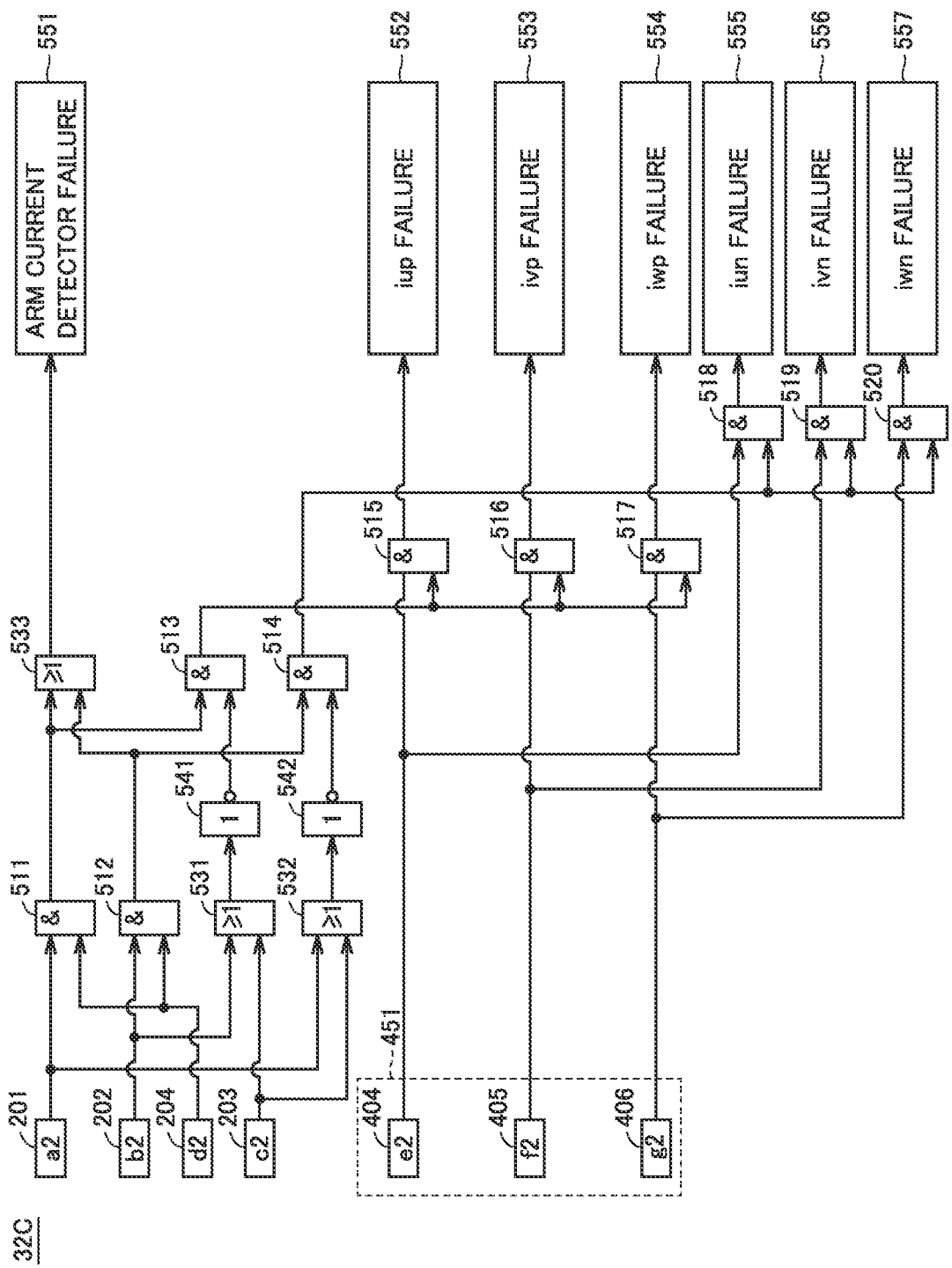
FIG. 10 is a functional block diagram of a failure detection unit that performs failure detection of arm current detectors in FIG. 8.

FIG. 10 is a functional block diagram of the failure detection unit that performs failure detection of arm current detectors in FIG. 8. Referring to FIG. 10, failure detection unit 32C includes an expression a2 determination unit 201, an expression b2 determination unit 202, an expression d2 determination unit 204, an expression c2 determination unit 203, an expression e2 determination unit 404, an expression f2 determination unit 405, an expression g2 determination unit 406, AND operators 511 to 520, OR operators 531 to 533, NOT operators 541 and 542, and determination result output units 551 to 557. The functions of these units are implemented, for example, by CPU 54 in FIG. 3 operating under instructions of a program.

Expression a2 determination unit 201, expression b2 determination unit 202, expression d2 determination unit 204, and expression c2 determination unit 203 in FIG. 10 respectively correspond to expression a2 determination unit 201, expression b2 determination unit 202, expression d2 determination unit 204, and expression c2 determination unit 203 in FIG. 7. Therefore, the description thereof will not be repeated.

Furthermore, the unit composed of expression determination units 201 to 204, AND operators 511 to 514, OR operators 531 to 533, and NOT operators 541 and 542 in FIG. 10 corresponds to the unit composed of expression determination units 201 to 204, AND operators 311, 312, 319, and 320, OR operators 331 to 333, and NOT operators 341 and 342 in FIG. 7.

Therefore, when the output of OR operator 533 in FIG. 10 is "1", determination result output unit 551 outputs that one of upper arm current detector 22 or lower arm current detector 23 is failed. When the output of AND operator 513 is "1", it is indicated that one of U-phase, V-phase, and W-phase upper arm current detectors 22 is failed. When the output of AND operator 514 is "1", it is indicated that one of U-phase, V-phase, and W-phase lower arm current detectors 23 is failed.

Expression e2 determination unit 404, expression f2 determination unit 405, and expression g2 determination unit 406 in FIG. 10 respectively correspond to expression e2 determination unit 404, expression f2 determination unit 405, and expression g2 determination unit 406 in FIG. 9. Therefore, when the output of expression e2 determination unit 404 is "1", it is indicated that one of U-phase upper arm current detector 22, U-phase lower arm current detector 23, and U-phase AC current detector 21 is failed. When the output of expression f2 determination unit 405 is "1", it is indicated that one of V-phase upper arm current detector 22, V-phase lower arm current detector 23, and V-phase AC current detector 21 is failed. When the output of expression g2 determination unit 406 is "1", it is indicated that one of W-phase upper arm current detector 22, W-phase lower arm current detector 23, and W-phase AC current detector 21 is failed.

Based on the above, the operation of AND operators 515 to 520 and determination result output units 552 to 557 will be described.

AND operator 515 performs AND operation of the output of AND operator 513 and the output of expression e2 determination unit 404. As the result, when the output of AND operator 515 is "1", determination result output unit 552 outputs that U-phase upper arm current detector 22 is failed (that is, the detection value of arm current iup is abnormal).

AND operator 516 performs AND operation of the output of AND operator 513 and the output of expression f2 determination unit 405. As the result, when the output of AND operator 516 is "1", determination result output unit 553 outputs that V-phase upper arm current detector 22 is failed (that is, the detection value of arm current ivp is abnormal).

AND operator 517 performs AND operation of the output of AND operator 513 and the output of expression g2 determination unit 406. As the result, when the output of AND operator 517 is "1", determination result output unit 554 outputs that W-phase upper arm current detector 22 is failed (that is, the detection value of arm current iwp is abnormal).

AND operator 518 performs AND operation of the output of AND operator 514 and the output of expression e2 determination unit 404. As the result, when the output of AND operator 518 is "1", determination result output unit 555 outputs that U-phase lower arm current detector 23 is failed (that is, the detection value of arm current iun is abnormal).

AND operator 519 performs AND operation of the output of AND operator 514 and the output of expression f2 determination unit 405. As the result, when the output of AND operator 519 is "1", determination result output unit 556 outputs that V-phase lower arm current detector 23 is failed (that is, the detection value of arm current ivn is abnormal).

AND operator 520 performs AND operation of the output of AND operator 514 and the output of expression g2 determination unit 406. As the result, when the output of AND operator 520 is "1", determination result output unit 557 outputs that W-phase lower arm current detector 23 is failed (that is, the detection value of arm current iwn is abnormal). As described above, a failed current detector among arm current detectors 22 and 23 of the phases can be identified.

Effects of Third Embodiment

To sum up, in power conversion device 1C in the third embodiment, arm current detectors 22 and 23, DC current detectors 25P and 25N installed on DC lines 13P and 13N, and AC current detectors 21 installed on AC lines 11U, 11V, and 11W are provided as current detectors. Control device 3 includes first failure detection unit 32C that detects the presence or absence of failure of each current detector for n upper arm current detectors 22 and n lower arm current detectors 23, second failure detection unit 33C that detects the presence or absence of failure of each of DC current detectors 25P and 25N, and third failure detection unit 34C that detects the presence or absence of failure of each of n AC current detectors.

First failure detection unit 32C includes first determination unit (expression d2 determination unit) 204, second determination unit (expression a2 determination unit) 201, third determination unit (expression b2 determination unit) 202, and fourth determination unit 451 (expression e2 determination unit 404, expression f2 determination unit 405, expression g2 determination unit 406). First to third determination units 204, 201, and 202 are the same as those in the second embodiment.

Unlike fourth determination unit 151 in the first and second embodiments, fourth determination unit 451 makes a determination based on comparison of the difference between the detection value of upper arm current detector 22 provided in any given first upper arm 5 and the detection value of lower arm current detector 23 provided in lower arm 6 corresponding to the first upper arm 5, with the detection value of AC current detector 21 provided on AC line 11 corresponding to the first upper arm. With the determination results of first to fourth determination units 204, 201, 202, and 451 altogether, which arm current detector is failed can be determined even when only one arm current detector is provided in each arm.

First failure detection units 32A and 32B in the first and second embodiments and first failure detection unit 32C in the third embodiment will now be compared. Failure detection unit 32B in the first and second embodiments compares the sum of detection values of U-phase upper arm and lower arm current detectors 22 and 23, the sum of detection values of V-phase upper arm and lower arm current detectors 22 and 23, and the sum of detection values of W-phase upper arm and lower arm current detectors 22 and 23 with each other, in fourth determination unit 151. The accuracy in this determination based on the comparison is influenced by circulating current. On the other hand, failure detection unit 32C in the third embodiment compares the difference between the detection value of upper arm current detector 22 and the detection value of lower arm current detector 23 with the detection value of AC current detector 21 installed on AC line 11, for each phase, in fourth determination unit 451. Therefore, failure detection unit 32C in the third embodiment can determine the presence or absence of failure of the current detectors using the failure determination expressions with fewer errors.

The configuration of second failure detection unit 33C is the same as the configuration of second failure detection unit 33B in the second embodiment and will not be further elaborated.

Third failure detection unit 34C includes first determination unit (expression d2 determination unit) 204, second determination unit (expression a2 determination unit) 201, third determination unit (expression b2 determination unit) 202, and fourth determination unit 451 described above. With the determination results of the first to fourth determination units 204, 201, 202, and 451 altogether, which AC current detector 21 is failed can be determined even when only one AC current detector 21 is provided on each AC line.

Fourth Embodiment

In the fourth to sixth embodiments, a method capable of identifying a failed current detector and continuing operation with the other normal current detector provided at the same location as the failed current detector when two current detectors are provided at the same location will be described. In the fourth embodiment, in particular, current detectors are provided only in each arm.

In the following, an overall configuration of a power conversion device 1D of the fourth embodiment will be described first. Next, failure determination expressions for current used in the fourth to sixth embodiments will be described. The failure determination expressions are based on Kirchhoff's first law (also referred to as current law) and the principle of three-phase alternating current. In particular, the failure determination expressions include determination expressions for comparing the detection values of two current detectors provided at the same location.

[Configuration of Power Conversion Device]

Figure 11:
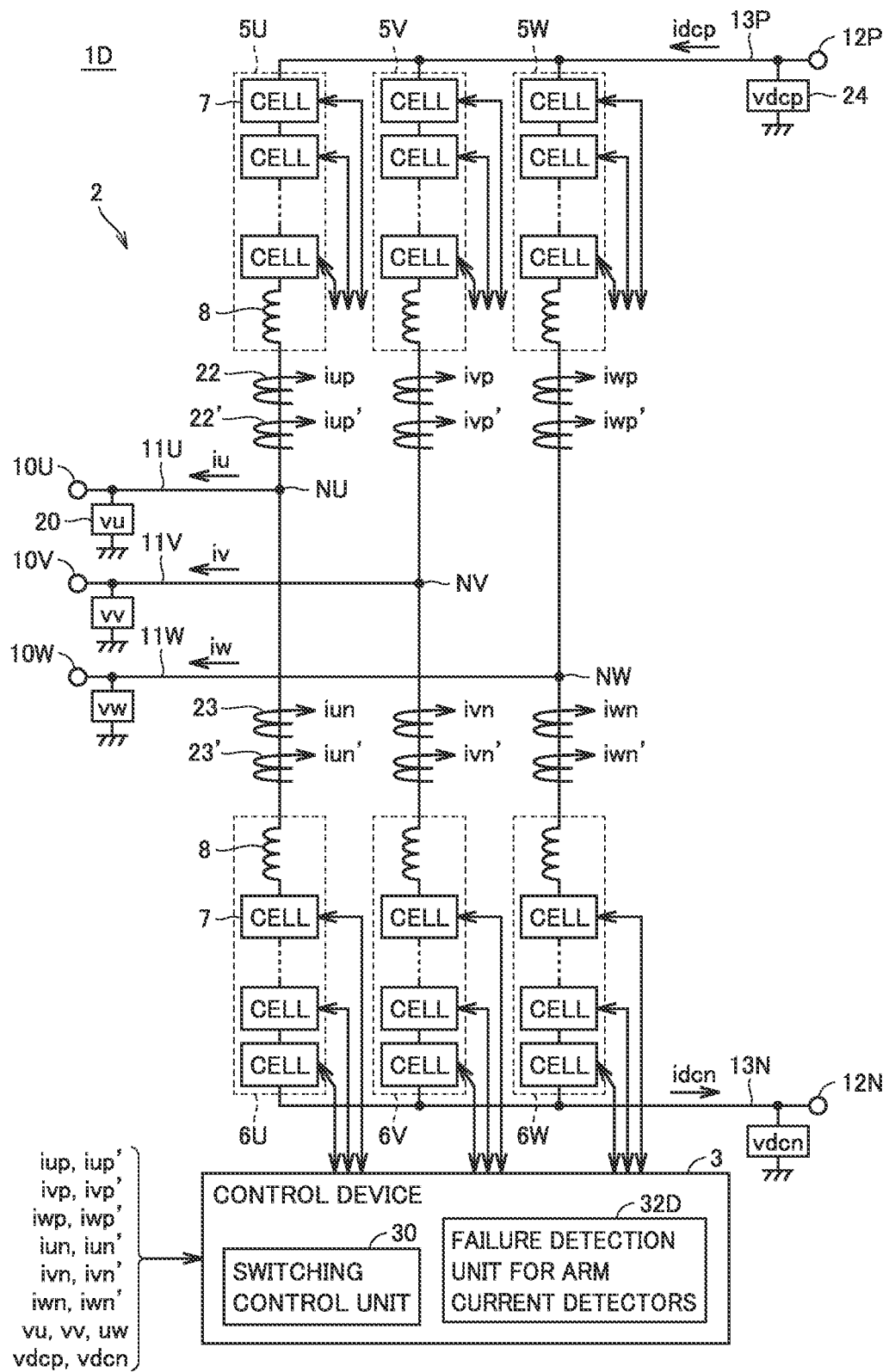
FIG. 11 is a schematic configuration diagram of a power conversion device 1D of a fourth embodiment.

FIG. 11 is a schematic configuration diagram of power conversion device 1D of the fourth embodiment. Power conversion device 1D in FIG. 11 differs from power conversion device 1A in FIG. 1 in that two arm current detectors 22 and two arm current detectors 23 are provided at the same locations. In the following, one of the two arm current detectors is referred to as first arm current detector 22, 23, and the other arm current detector is referred to as second arm current detector 22', 23'. As shown in FIG. 11, the arm current value detected by first upper arm current detector 22 of the U-phase upper arm is denoted as iup, and the arm current value detected by second upper arm current detector 22' of the U-phase upper arm is denoted as iup'. This is the same with the detection values of arm current detectors 22, 23, 22', and 23' of the other phases.

Failure detection unit 32D of control device 3 performs failure detection of a current detector, further based on comparison between the detection values of two arm current detectors provided at the same location. In other respects, FIG. 11 is similar to FIG. 1 and the same or corresponding parts are denoted by the same reference signs and will not be further elaborated.

[Failure Determination Expressions for Current Detectors]

Failure determination expressions for the current detectors used in the fourth to sixth embodiments will now be described. The failure determination expressions are based on Kirchhoff's first law (also referred to as current law) and the principle of three-phase alternating current, and the determination accuracy thereof is higher than in the first to third embodiments. In the fourth to sixth embodiments, the expressions selected from the following expressions (a3) to (k3), (m3), (n3), (p3) to (t3), (m3'), (n3'), and (p3') to (t3') are used as failure determination expressions.

(1) According to Kirchhoff's first law, the detection values of the current detectors installed at the same location are equal. Therefore, for DC currents idcp and idcp' on positive electrode-side DC line 13P and DC currents idcn and idcn' on negative electrode-side DC line 13N, $$idcp=idcp'$$

$$idcn=idcn'$$

hold. For current values iup, iup', iun, and iun' of U-phase upper arm 5U and U-phase lower arm 6U, $$iup=iup'$$

$$iun=iun'$$

hold. Similarly, for current values ivp, ivp', ivn, and ivn' of V-phase upper arm 5V and V-phase lower arm 6V, $$ivp=ivp'$$

$$ivn=ivn'$$

hold. For current values iwp, iwp', iwn, and iwn' of W-phase upper arm 5W and W-phase lower arm 6W, $$iwp=iwp'$$

$$iwn=iwn'$$

hold. Furthermore, for AC currents iu, iu', iv, iv', iw, and iw' of AC lines 11U, 11V, and 11W, $$iu=iu'$$

$$iv=iv'$$

$$iw=iw'$$

hold.

Therefore, the failure determination expressions are written as $$|idcp-idcp'|>\varepsilon \quad (a3)$$

$$|idcn-idcn'|>\varepsilon \quad (b3)$$

$$|iup-iup'|>\varepsilon \quad (c3)$$

$$|ivp-ivp'|>\varepsilon \quad (d3)$$

$$|iwn-iwn'|>\varepsilon \quad (e3)$$

$$|iun-iun'|>\varepsilon \quad (f3)$$

$$|ivn-ivn'|>\varepsilon \quad (g3)$$

$$|iwn-iwn'|>\varepsilon \quad (h3)$$

$$|iu-iu'|>\varepsilon \quad (i3)$$

$$|iv-iv'|>\varepsilon \quad (j3)$$

$$|iw-iw'|>\varepsilon \quad (k3).$$

The positive current thresholds ε of the failure determination expressions are not necessarily the same value. Similarly, the current thresholds ε in the other failure determination expressions described later also are not necessarily the same value.

(2) According to Kirchhoff's first law, the sum of currents iup, ivp, and iwp flowing through upper arms 5U, 5V, and 5W is equal to DC current idcp flowing through positive electrode-side DC line 13P. Therefore, $$idcp=iup+ivp+iwp$$

holds. Based on the above, the failure determination expressions are written as $$|idcp-(iup+ivp+iwp)|>\varepsilon \quad (m3)$$

$$|idcp'-(iup'+ivp'+iwp')|>\varepsilon \quad (m3').$$

(3) According to Kirchhoff's first law, the sum of currents iun, ivn, and iwn flowing through lower arms 6U, 6V, and 6W is equal to DC current idcn flowing through negative electrode-side DC line 13N. Therefore, $$idcn=iun+ivn+iwn$$

holds. Based on the above, the failure determination expressions are written as $$|idcn-(iun+ivn+iwn)|>\varepsilon \quad (n3)$$

$$|idcn'-(iun'+ivn'+iwn')|>\varepsilon \quad (n3').$$

(4) According to the principle of three-phase alternating current, the sum of currents iu, iv, and iw of AC lines 11U, 11V, and 11W interconnected to the respective arms is zero. That is, $$iu+iv+iw=0$$

holds. Therefore, for DC current idcp flowing through positive electrode-side DC line 13P and DC current idcn flowing through negative electrode-side DC line 13N, $$idcp-idcn=iu+iv+iw=0$$

holds. Accordingly, DC current idcp is equal to DC current idcn. That is, $$idcp=idcn$$

holds. Therefore, the failure determination expressions are written as $$|idcp-idcn|>\varepsilon \quad (p3)$$

$$|idcp'-idcn'|>\varepsilon \quad (p3').$$

(5) Based on (1) to (3) above, the sum of currents iup, ivp, and iwp flowing through upper arms 5U, 5V, and 5W is equal to the sum of currents iun, ivn, and iwn flowing through lower arms 6U, 6V, and 6W. That is, $$iup+ivp+iwp=iun+ivn+iwn$$

holds. Therefore, the failure determination expressions are written as $$|(iup+ivp+iwp)-(iun+ivn+iwn)|>\varepsilon \quad (q3)$$

$$|(iup'+ivp'+iwp')-(iun'+ivn'+iwn')|>\varepsilon \quad (q33').$$

(6) According to Kirchhoff's first law, the difference between current iup of U-phase upper arm 5U and current iun of U-phase lower arm 6U interconnected to U-phase AC line 11U is equal to AC current iu of U-phase AC line 11U. This is the same with the V phase and the W phase. Therefore, $$iup-iun=iu, ivp-ivn=iv, iwp-iwn=iw$$

hold. When a transformer is provided on AC line 11U, 11V, 11W, the value of AC current iu, iv, iw is the value converted in terms of the connection portion NU, NV, NW. Therefore, the failure determination expressions are written as $$|iu-(iup-iun)|>\varepsilon \quad (r3)$$

$$|iu'-(iup'-iun')|>\varepsilon \quad (r3')$$

$$|iv-(ivp-ivn)|>\varepsilon \quad (s3)$$

$$|iv'-(ivp'-ivn')|>\varepsilon \quad (s3')$$

$$|iw-(iwp-iwn)|>\varepsilon \quad (t3)$$

$$|iw'-(iwp'-iwn')|>\varepsilon \quad (t3').$$

[Operation of Failure Detection Unit 32D for Arm Current Detectors 22, 23, 22', 23']

The operation of failure detection unit 32D for arm current detectors 22, 23, 22', and 23' in power conversion device 1D in FIG. 11 will now be described.

Figure 12:
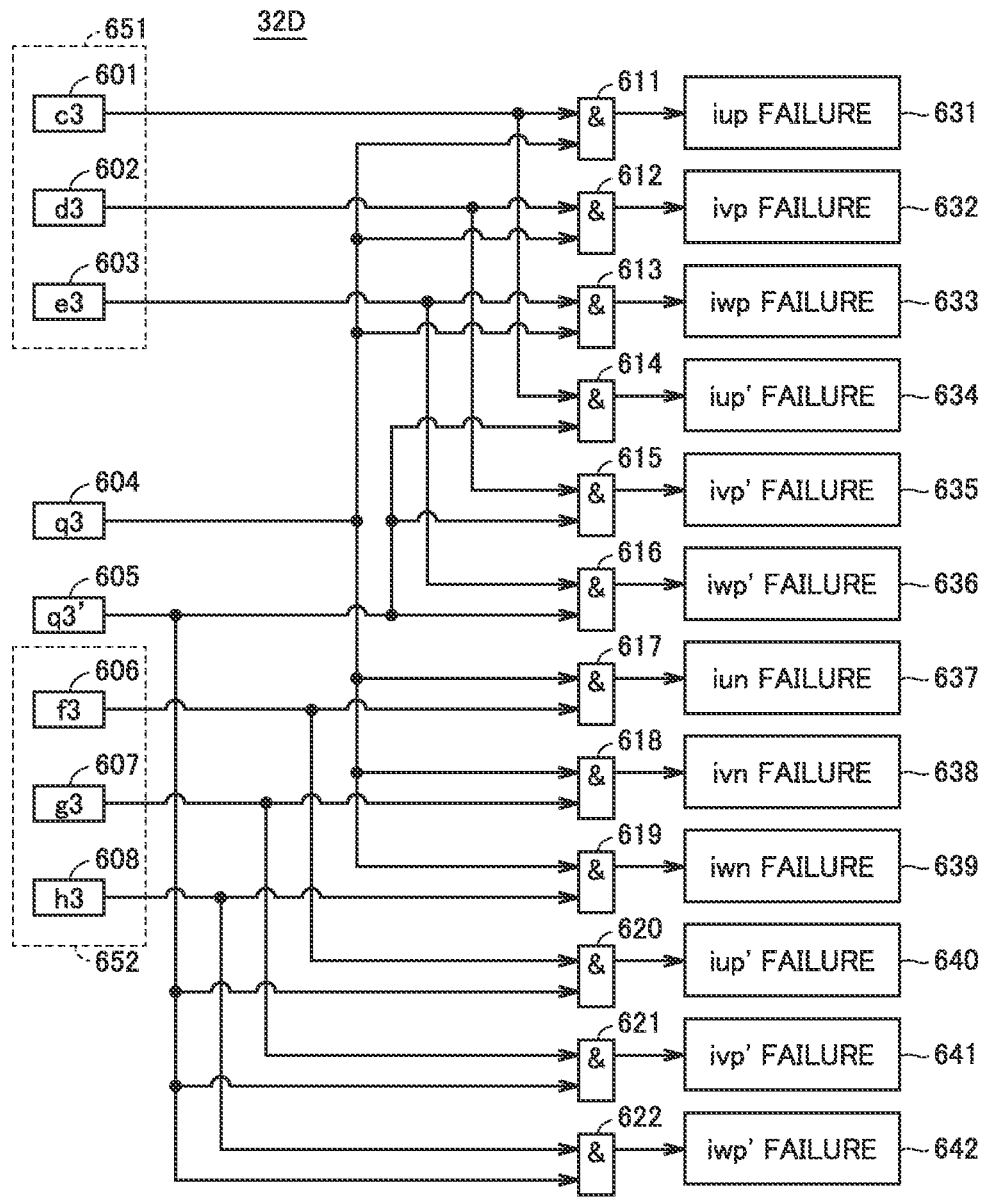
FIG. 12 is a functional block diagram of a failure detection unit that performs failure detection of arm current detectors in FIG. 11.

FIG. 12 is a functional block diagram of the failure detection unit that performs failure detection of arm current detectors in FIG. 11. Referring to FIG. 12, failure detection unit 32D includes an expression c3 determination unit 601, an expression d3 determination unit 602, an expression e3 determination unit 603, an expression q3 determination unit 604, an expression q3' determination unit 605, an expression f3 determination unit 606, an expression g3 determination unit 607, an expression h3 determination unit 608, AND operators 611 to 622, and determination result output units 631 to 642. The functions of these units are implemented, for example, by CPU 54 in FIG. 3 operating under instructions of a program.

Expression c3 determination unit 601 determines whether the expression (c3) holds based on comparison between the detection values of two current detectors 22 and 22' provided in U-phase upper arm 5U. Therefore, when the expression (c3) holds, that is, when the output of expression c3 determination unit 601 is "1", it is indicated that one of two current detectors 22 and 22' provided in U-phase upper arm 5U is failed.

Expression d3 determination unit 602 determines whether the expression (d3) holds based on comparison between the detection values of two current detectors 22 and 22' provided in V-phase upper arm 5V. Therefore, when the expression (d3) holds, that is, when the output of expression d3 determination unit 602 is "1", it is indicated that one of two current detectors 22 and 22' provided in V-phase upper arm 5V is failed.

Expression e3 determination unit 603 determines whether the expression (e3) holds based on comparison between the detection values of two current detectors 22 and 22' provided in W-phase upper arm 5W. Therefore, when the expression (e3) holds, that is, when the output of expression e3 determination unit 603 is "1", it is indicated that one of two current detectors 22 and 22' provided in W-phase upper arm 5W is failed.

Expression f3 determination unit 606 determines whether the expression (f3) holds based on comparison between the detection values of two current detectors 23 and 23' provided in U-phase lower arm 6U. Therefore, when the expression (f3) holds, that is, when the output of expression f3 determination unit 606 is "1", it is indicated that one of two current detectors 23 and 23' provided in U-phase lower arm 6U is failed.

Expression g3 determination unit 607 determines whether the expression (g3) holds based on comparison between the detection values of two current detectors 23 and 23' provided in V-phase lower arm 6V. Therefore, when the expression (g3) holds, that is, when the output of expression g3 determination unit 607 is "1", it is indicated that one of two current detectors 23 and 23' provided in V-phase lower arm 6V is failed.

Expression h3 determination unit 608 determines whether the expression (h3) holds based on comparison between the detection values of two current detectors 23 and 23' provided in V-phase lower arm 6V. Therefore, when the expression (h3) holds, that is, when the output of expression h3 determination unit 608 is "1", it is indicated that one of two current detectors 23 and 23' provided in W-phase lower arm 6W is failed.

Expression q3 determination unit 604 determines whether the expression (q3) holds, based on comparison between the sum of detection values of first upper arm current detectors 22 provided in upper arms 5U, 5V, and 5W and the sum of detection values of first lower arm current detectors 23 provided in lower arms 6U, 6V, and 6W. Therefore, when the expression (q3) holds, that is, when the output of expression q3 determination unit 604 is "1", it is indicated that one of first upper arm current detectors 22 provided in upper arms 5U, 5V, and 5W and first lower arm current detectors 23 provided in lower arms 6U, 6V, and 6W is failed.

Expression q3' determination unit 605 determines whether the expression (q3') holds, based on comparison between the sum of detection values of second upper arm current detectors 22' provided in upper arms 5U, 5V, and 5W and the sum of detection values of second lower arm current detectors 23' provided in lower arms 6U, 6V, and 6W. Therefore, when the expression (q3') holds, that is, when the output of expression q3' determination unit 605 is "1", it is indicated that one of second upper arm current detectors 22' provided in upper arms 5U, 5V, and 5W and second lower arm current detectors 23' provided in lower arms 6U, 6V, and 6W is failed.

Based on the above, the operation of AND operators 611 to 622 and determination result output units 631 to 642 will be described.

AND operator 611 performs AND operation of the output of expression c3determination unit 601 and the output of expression q3 determination unit 604. When the output of AND operator 611 is "1", determination result output unit 631 determines that first upper arm current detector 22 in U-phase upper arm 5U is failed (that is, the detection value of arm current iup is abnormal).

AND operator 612 performs AND operation of the output of expression d3 determination unit 602 and the output of expression q3 determination unit 604. When the output of AND operator 612 is "1", determination result output unit 632 determines that first upper arm current detector 22 in V-phase upper arm 5V is failed (that is, the detection value of arm current ivp is abnormal).

AND operator 613 performs AND operation of the output of expression e3 determination unit 603 and the output of expression q3 determination unit 604. When the output of AND operator 613 is "1", determination result output unit 633 determines that first upper arm current detector 22 in W-phase upper arm 5W is failed (that is, the detection value of arm current iwp is abnormal).

AND operator 614 performs AND operation of the output of expression c3 determination unit 601 and the output of expression q3' determination unit 605. When the output of AND operator 614 is "1", determination result output unit 634 determines that second upper arm current detector 22' in U-phase upper arm 5U is failed (that is, the detection value of arm current iup' is abnormal).

AND operator 615 performs AND operation of the output of expression d3 determination unit 602 and the output of expression q3' determination unit 605. When the output of AND operator 615 is "1", determination result output unit 635 determines that second upper arm current detector 22' in V-phase upper arm 5V is failed (that is, the detection value of arm current ivp' is abnormal).

AND operator 616 performs AND operation of the output of expression e3 determination unit 603 and the output of expression q3' determination unit 605. When the output of AND operator 616 is "1", determination result output unit 636 determines that second upper arm current detector 22' in W-phase upper arm 5W is failed (that is, the detection value of arm current iwp' is abnormal).

AND operator 617 performs AND operation of the output of expression f3 determination unit 606 and the output of expression q3 determination unit 604. When the output of AND operator 617 is "1", determination result output unit 637 determines that first lower arm current detector 23 in U-phase lower arm 6U is failed (that is, the detection value of arm current iun is abnormal).

AND operator 618 performs AND operation of the output of expression g3 determination unit 607 and the output of expression q3 determination unit 604. When the output of AND operator 618 is "1", determination result output unit 638 determines that first lower arm current detector 23 in V-phase lower arm 6V is failed (that is, the detection value of arm current ivn is abnormal).

AND operator 619 performs AND operation of the output of expression h3 determination unit 608 and the output of expression q3 determination unit 604. When the output of AND operator 619 is "1", determination result output unit 639 determines that first lower arm current detector 23 in W-phase lower arm 6W is failed (that is, the detection value of arm current iwn is abnormal).

AND operator 620 performs AND operation of the output of expression f3 determination unit 606 and the output of expression q3' determination unit 605. When the output of AND operator 620 is "1", determination result output unit 640 determines that second lower arm current detector 23' in U-phase lower arm 6U is failed (that is, the detection value of arm current iun' is abnormal).

AND operator 621 performs AND operation of the output of expression g3 determination unit 607 and the output of expression q3' determination unit 605. When the output of AND operator 621 is "1", determination result output unit 641 determines that second lower arm current detector 23' in V-phase lower arm 6V is failed (that is, the detection value of arm current ivn' is abnormal).

AND operator 622 performs AND operation of the output of expression h3 determination unit 608 and the output of expression q3' determination unit 605. When the output of AND operator 622 is "1", determination result output unit 642 determines that second lower arm current detector 23' in W-phase lower arm 6W is failed (that is, the detection value of arm current iwn' is abnormal). As described above, a failed current detector among first arm current detectors 22 and 23 of the phases and second arm current detectors 22' and 23' of the phases can be identified.

Effects of Fourth Embodiment

As described above, in power conversion device 1D in the fourth embodiment, first upper arm current detector 22 and second upper arm current detector 22' are provided in each of upper arms 5U, 5V, and 5W, and first lower arm current detector 23 and second lower arm current detector 23' are provided in each of lower arms 6U, 6V, and 6W.

Control device 3 includes first failure detection unit 32D that detects the presence or absence of failure of each current detector, for n first upper arm current detectors 22, n second upper arm current detectors 22', n first lower arm current detectors 23, and n second lower arm current detectors 23'. First failure detection unit 32D includes first determination unit 651 (601 to 603), second determination unit 652 (606 to 608), third determination unit (expression q3 determination unit) 604, and fourth determination unit (expression q3' determination unit) 605.

First determination unit 651 makes a determination based on comparison between the detection value of first upper arm current detector 22 and the detection value of second upper arm current detector 22' installed in the same upper arm 5. Second determination unit 652 makes a determination based on comparison between the detection value of first lower arm current detector 23 and the detection value of second lower arm current detector 23' installed in the same lower arm 6. Third determination unit 604 makes a determination based on comparison between the sum of detection values of n first upper arm current detectors 22 and the sum of detection values of n first lower arm current detectors 23. Fourth determination unit 605 makes a determination based on comparison between the sum of detection values of n second upper arm current detectors 22' and the sum of detection values of n second lower arm current detectors 23'.

With the determination results of first and second determination units 651 and 652, the arm current detector is failed in which installation location can be determined. Then, with the determination results of the third and fourth determination units 604 and 605, whether the first arm current detector is failed or the second arm current detector is failed can be determined. Therefore, with the determination results of the first to fourth determination units 651, 652, 604, and 605 altogether, which arm current detector is failed can be determined, and the operation can be continued with the other normal current detector provided at the same location as the failed current detector.

Fifth Embodiment

In the fifth embodiment, in addition to first arm current detectors 22 and 23 and second arm current detectors 22' and 23', a first DC current detector 25P and a second DC current detector 25P' are further provided on positive electrode-side DC line 13P, and a first DC current detector 25N and a second DC current detector 25N' are further provided on negative electrode-side DC line 13N.

Figure 13:
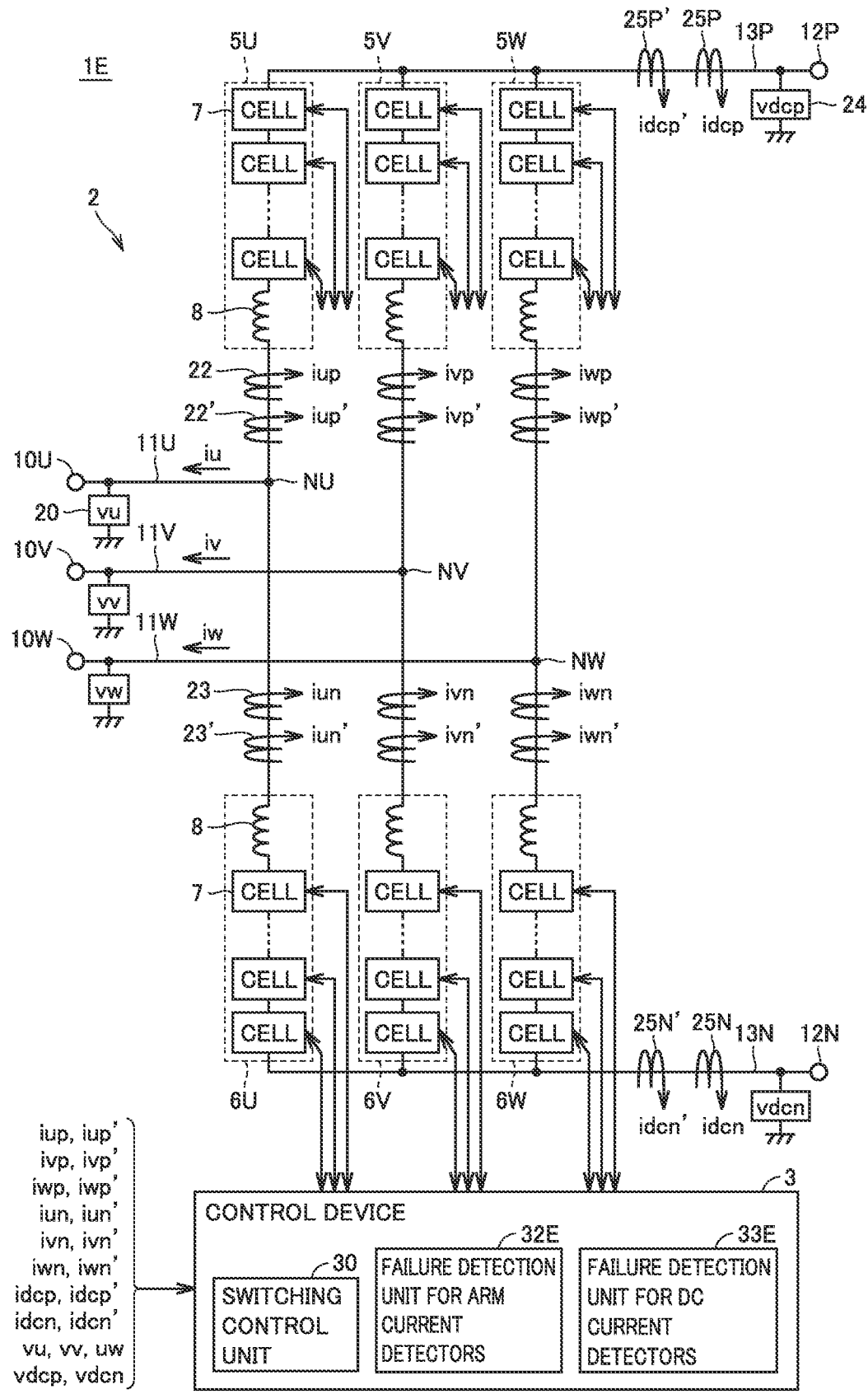
FIG. 13 is a schematic configuration diagram of a power conversion device of a fifth embodiment.

FIG. 13 is a schematic configuration diagram of a power conversion device of the fifth embodiment. A power conversion device 1E in FIG. 13 differs from power conversion device 1D in FIG. 11 in that it further includes first DC current detectors 25P and 25N and second DC current detectors 25P' and 25N' respectively provided on DC lines 13P and 13N.

Switching control unit 30 of control device 3 in FIG. 13 controls the switching of switching elements 41p and 41n of each converter cell 7, further based on the values of DC currents idcp, idcn, idcp', and idcn' detected by first DC current detectors 25P and 25N and second DC current detectors 25P' and 25N'.

Furthermore, control device 3 in FIG. 13 differs from control device 3 in FIG. 11 in that it includes a failure detection unit 32E for arm current detectors 22, 23, 22', and 23' as well as a failure detection unit 33E for DC current detectors 25P, 25N, 25P', and 25N'. In other respects, FIG. 13 is similar to FIG. 11, and the same or corresponding parts are denoted by the same reference signs and will not be further elaborated.

[Operation of Failure Detection Unit 33E for DC Current Detectors]

The operation of failure detection unit 33E for DC current detectors 25P, 25N, 25P', and 25N' installed on DC lines 13P and 13N will now be described. The determination expressions selected from the failure determination expressions described in the fourth embodiment are used as failure determination expressions.

Figure 14:
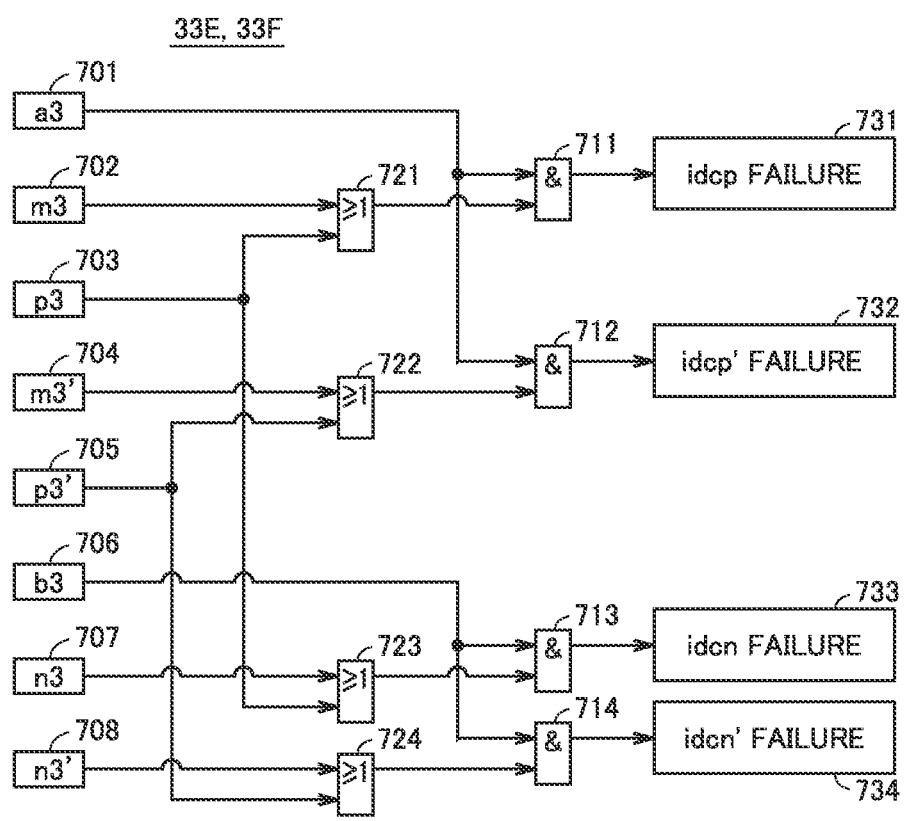
FIG. 14 is a functional block diagram of a failure detection unit that performs failure detection of DC current detectors in FIG. 13.

FIG. 14 is a functional block diagram of the failure detection unit that performs failure detection of DC current detectors in FIG. 13. Referring to FIG. 14, failure detection unit 33E includes an expression a3 determination unit 701, an expression m3 determination unit 702, an expression p3 determination unit 703, an expression m3' determination unit 704, an expression p3' determination unit 705, an expression b3 determination unit 706, an expression n3 determination unit 707, an expression n3' determination unit 708, AND operators 711 to 714, OR operators 721 to 724, and determination result output units 731 to 734. The functions of these units are implemented, for example, by CPU 54 in FIG. 3 operating under instructions of a program.

Expression a3 determination unit 701 determines whether the expression (a3) holds based on comparison between the detection values of two DC current detectors 25P and 25P' provided on positive electrode-side DC line 13P. Therefore, when the output of expression a3 determination unit 701 is "1", it is indicated that one of two DC current detectors 25P and 25P' provided on positive electrode-side DC line 13P is failed.

Expression m3 determination unit 702 determines whether the expression (m3) holds, based on comparison between the detection value of first DC current detector 25P provided on positive electrode-side DC line 13P and the sum of detection values of first upper arm current detectors 22 provided on upper arms 5U, 5V, and 5W.

Therefore, when the output of expression m3 determination unit 702 is "1", it is indicated that one of first DC current detector 25P provided on positive electrode-side DC line 13P and first upper arm current detectors 22 provided in upper arms 5U, 5V, and 5W is failed.

Expression p3 determination unit 703 detects whether the expression (p3) holds, based on comparison between the detection value of first DC current detector 25P provided on positive electrode-side DC line 13P and the detection value of first DC current detector 25N provided on negative electrode-side DC line 13N. Therefore, when the output of expression p3 determination unit 703 is "1", it is indicated that one of first DC current detectors 25P and 25N provided on DC lines 13P and 13N is failed.

Expression m3' determination unit 704 determines whether the expression (m3') holds, based on comparison between the detection value of second DC current detector 25P' provided on positive electrode-side DC line 13P and the sum of detection values of second upper arm current detectors 22' provided in upper arms 5U, 5V, and 5W. Therefore, when the output of expression m3' determination unit 704 is "1", it is indicated that one of second DC current detector 25P' provided on positive electrode-side DC line 13P and second upper arm current detectors 22' provided in upper arms 5U, 5V, and 5W is failed.

Expression p3' determination unit 705 detects whether the expression (p3') holds, based on comparison between the detection value of second DC current detector 25P' provided on positive electrode-side DC line 13P and the detection value of second DC current detector 25N' provided on negative electrode-side DC line 13N. Therefore, when the output of expression p3' determination unit 705 is "1", it is indicated that one of second DC current detectors 25P' and 25N' provided on DC lines 13P and 13N is failed.

Expression b3 determination unit 706 determines whether the expression (b3) holds based on comparison between the detection values of two DC current detectors 25N and 25N' provided on negative electrode-side DC line 13N. Therefore, when the output of expression b3 determination unit 706 is "1", it is indicated that one of two DC current detectors 25N and 25N' provided on negative electrode-side DC line 13N is failed.

Expression n3 determination unit 707 determines whether the expression (n3) holds, based on comparison between the detection value of first DC current detector 25N provided on negative electrode-side DC line 13N and the sum of detection values of first lower arm current detectors 23 provided in lower arms 6U, 6V, and 6W. Therefore, when the output of expression n3 determination unit 707 is "1", it is indicated that one of first DC current detector 25N provided on negative electrode-side DC line 13N and first lower arm current detectors 23 provided in lower arms 6U, 6V, and 6W is failed.

Expression n3' determination unit 708 determines whether the expression (n3') holds, based on comparison between the detection value of second DC current detector 25N' provided on negative electrode-side DC line 13N and the sum of detection values of second lower arm current detectors 23' provided in lower arms 6U, 6V, and 6W. Therefore, when the output of expression n3' determination unit 708 is "1", it is indicated that one of second DC current detector 25N' provided on negative electrode-side DC line 13N and second lower arm current detectors 23' provided in lower arms 6U, 6V, and 6W is failed.

Based on the above, the operation of AND operators 711 to 714, OR operators 721 to 724, and determination result output units 731 to 734 will be described.

OR operator 721 performs OR operation of the output of expression m3 determination unit 702 and the output of expression p3 determination unit 703. AND operator 711 performs AND operation of the output of expression a3 determination unit 701 and the output of OR operator 721. Therefore, when the output of AND operator 711 is "1", determination result output unit 731 outputs that first DC current detector 25P provided on positive electrode-side DC line 13P is failed (that is, the detection value of DC current idcp is abnormal).

OR operator 722 performs OR operation of the output of expression m3' determination unit 704 and the output of expression p3' determination unit 705. AND operator 712 performs AND operation of the output of expression a3 determination unit 701 and the output of OR operator 722. Therefore, when the output of AND operator 712 is "1", determination result output unit 732 outputs that second DC current detector 25P' provided on positive electrode-side DC line 13P is failed (that is, the detection value of DC current idcp' is abnormal).

OR operator 723 performs OR operation of the output of expression n3 determination unit 707 and the output of expression p3 determination unit 703. AND operator 713 performs AND operation of the output of expression b3 determination unit 706 and the output of OR operator 723. Therefore, when the output of AND operator 713 is "1", determination result output unit 733 outputs that first DC current detector 25N provided on negative electrode-side DC line 13N is failed (that is, the detection value of DC current idcn is abnormal).

OR operator 724 performs OR operation of the output of expression n3' determination unit 708 and the output of expression p3' determination unit 705. AND operator 714 performs AND operation of the output of expression b3 determination unit 706 and the output of OR operator 724. Therefore, when the output of AND operator 714 is "1", determination result output unit 734 outputs that second DC current detector 25N' provided on negative electrode-side DC line 13N is failed (that is, the detection value of DC current idcn' is abnormal). As described above, a failed current detector among DC current detectors 25, 25P', and 25N' provided on DC lines 13P and 13N can be identified.

[Operation of Failure Detection Unit 32E for Arm Current Detectors 22, 23, 22', 23']

The operation of failure detection unit 32E for arm current detectors 22, 23, 22', and 23' in power conversion device 1E in FIG. 11 will now be described.

Figure 15:
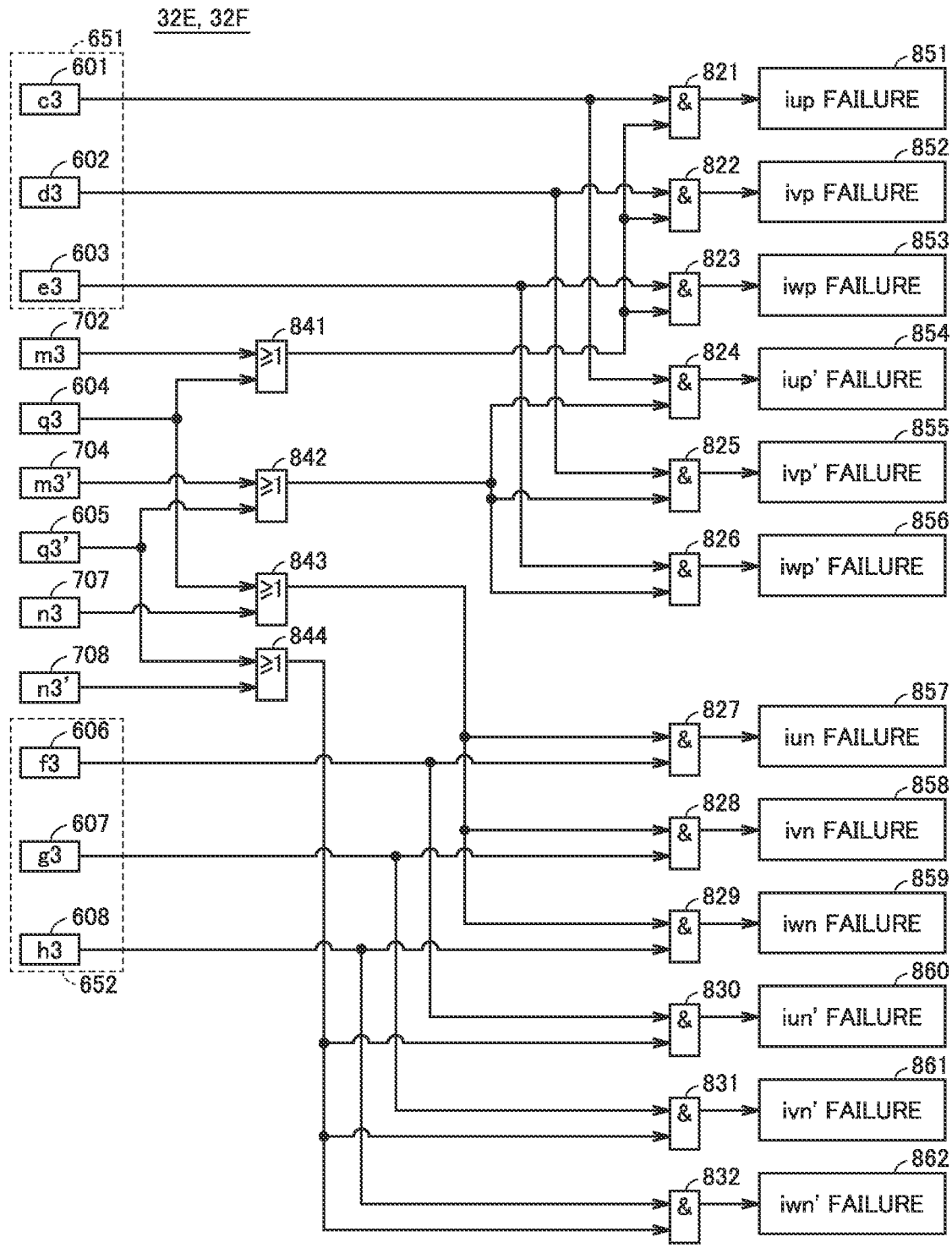
FIG. 15 is a functional block diagram of a failure detection unit that performs failure detection of arm current detectors in FIG. 13.

FIG. 15 is a functional block diagram of the failure detection unit that performs failure detection of arm current detectors in FIG. 13. Referring to FIG. 15, failure detection unit 32E includes an expression c3 determination unit 601, an expression d3 determination unit 602, an expression e3 determination unit 603, an expression m3 determination unit 702, an expression q3 determination unit 604, an expression m3' determination unit 704, an expression q3' determination unit 605, an expression n3 determination unit 707, an expression n3' determination unit 708, an expression f3 determination unit 606, an expression g3 determination unit 607, an expression h3 determination unit 608, AND operators 821 to 832, OR operators 841 to 844, and determination result output units 851 to 862.

Expression c3 determination unit 601, expression d3 determination unit 602, expression e3 determination unit 603, expression q3 determination unit 604, expression q3' determination unit 605, expression f3 determination unit 606, expression g3 determination unit 607, and expression h3 determination unit 608 in FIG. 15 respectively correspond to expression c3 determination unit 601, expression d3 determination unit 602, expression e3 determination unit 603, expression q3 determination unit 604, expression q3' determination unit 605, expression f3 determination unit 606, expression g3 determination unit 607, and expression h3 determination unit 608 in FIG. 12. Therefore, the detailed description thereof will not be repeated.

Expression m3 determination unit 702, expression m3' determination unit 704, expression n3 determination unit 707, and expression n3' determination unit 708 in FIG. 15 respectively correspond to expression m3 determination unit 702, expression m3' determination unit 704, expression n3 determination unit 707, and expression n3' determination unit 708 in FIG. 14. Therefore, the detailed description thereof will not be repeated.

OR operator 841 performs OR operation of the output of expression m3 determination unit 702 and the output of expression q3 determination unit 604. Therefore, when one of first upper arm current detectors 22 provided in upper arms 5U, 5V, and 5W is failed, the output of OR operator 841 is "1".

OR operator 842 performs OR operation of the output of expression m3' determination unit 704 and the output of expression q3' determination unit 605. Therefore, when one of second upper arm current detectors 22' provided on upper arms 5U, 5V, and 5W is failed, the output of OR operator 842 is "1".

OR operator 843 performs OR operation of the output of expression n3 determination unit 707 and the output of expression q3 determination unit 604. Therefore, when one of first lower arm current detectors 23 provided in lower arms 6U, 6V, and 6W is failed, the output of OR operator 843 is "1".

OR operator 844 performs OR operation of the output of expression n3' determination unit 708 and the output of expression q3' determination unit 605. Therefore, when one of second lower arm current detectors 23' provided in lower arms 6U, 6V, and 6W is failed, the output of OR operator 844 is "1". In OR operators 841 to 844, more determination expressions are combined than in the fourth embodiment to increase the determination accuracy.

Based on the above, the operation of AND operators 821 to 622 and determination result output units 851 to 642 will be described.

AND operator 821 performs AND operation of the output of expression c3 determination unit 601 and the output of OR operator 841. When the output of AND operator 821 is "1", determination result output unit 851 determines that first upper arm current detector 22 in U-phase upper arm 5U is failed (that is, the detection value of arm current iup is abnormal).

AND operator 822 performs AND operation of the output of expression d3 determination unit 602 and the output of OR operator 841. When the output of AND operator 822 is "1", determination result output unit 852 determines that first upper arm current detector 22 in V-phase upper arm 5V is failed (that is, the detection value of arm current ivp is abnormal).

AND operator 823 performs AND operation of the output of expression e3 determination unit 603 and the output of OR operator 841. When the output of AND operator 823 is "1", determination result output unit 853 determines that first upper arm current detector 22 in W-phase upper arm 5W is failed (that is, the detection value of arm current iwp is abnormal).

AND operator 824 performs AND operation of the output of expression c3 determination unit 601 and the output of OR operator 842. When the output of AND operator 824 is "1", determination result output unit 854 determines that second upper arm current detector 22' in U-phase upper arm 5U is failed (that is, the detection value of arm current iup' is abnormal).

AND operator 825 performs AND operation of the output of expression d3 determination unit 602 and the output of OR operator 842. When the output of AND operator 825 is "1", determination result output unit 855 determines that second upper arm current detector 22' in V-phase upper arm 5V is failed (that is, the detection value of arm current ivp' is abnormal).

AND operator 826 performs AND operation of the output of expression e3 determination unit 603 and the output of OR operator 842. When the output of AND operator 826 is "1", determination result output unit 856 determines that second upper arm current detector 22' in W-phase upper arm 5W is failed (that is, the detection value of arm current iwp' is abnormal).

AND operator 827 performs AND operation of the output of expression f3 determination unit 606 and the output of OR operator 843. When the output of AND operator 827 is "1", determination result output unit 857 determines that first lower arm current detector 23 in U-phase lower arm 6U is failed (that is, the detection value of arm current iun is abnormal).

AND operator 828 performs AND operation of the output of expression g3 determination unit 607 and the output of OR operator 843. When the output of AND operator 828 is "1", determination result output unit 858 determines that first lower arm current detector 23 in V-phase lower arm 6V is failed (that is, the detection value of arm current ivn is abnormal).

AND operator 829 performs AND operation of the output of expression h3 determination unit 608 and the output of OR operator 843. When the output of AND operator 829 is "1", determination result output unit 859 determines that first lower arm current detector 23 in W-phase lower arm 6W is failed (that is, the detection value of arm current iwn is abnormal).

AND operator 830 performs AND operation of the output of expression f3 determination unit 606 and the output of OR operator 844. When the output of AND operator 830 is "1", determination result output unit 860 determines that second lower arm current detector 23' in U-phase lower arm 6U is failed (that is, the detection value of arm current iun' is abnormal).

AND operator 831 performs AND operation of the output of expression g3 determination unit 607 and the output of OR operator 844. When the output of AND operator 831 is "1", determination result output unit 861 determines that second lower arm current detector 23' in V-phase lower arm 6V is failed (that is, the detection value of arm current ivn' is abnormal).

AND operator 832 performs AND operation of the output of expression h3 determination unit 608 and the output of OR operator 844. When the output of AND operator 832 is "1", determination result output unit 862 determines that second lower arm current detector 23' in W-phase lower arm 6W is failed (that is, the detection value of arm current iwn' is abnormal). As described above, a failed current detector among first arm current detectors 22 and 23 and second arm current detectors 22' and 23' of the phases can be identified.

Effects of Fifth Embodiment

To sum up, in power conversion device 1E in the fifth embodiment, in addition to first arm current detectors 22 and 23 and second arm current detectors 22' and 23', first DC current detectors 25P and 25N (first positive electrode-side DC current detector 25P, first negative electrode-side DC current detector 25N) are respectively provided on DC lines 13P and 13N, and furthermore, second DC current detectors 25P' and 25N' (second positive electrode-side DC current detector 25P', second negative electrode-side DC current detector 25N') are respectively provided.

Control device 3 includes first failure detection unit 32E and second failure detection unit 33E. First failure detection unit 32E detects the presence or absence of failure of each current detector, for n first upper arm current detectors 22, n second upper arm current detectors 22', n second lower arm current detectors 23, and n second lower arm current detectors 23'. Second failure detection unit 33E detects the presence or absence of failure of each of first positive electrode-side DC current detector 25P, second positive electrode-side DC current detector 25P', first negative electrode-side DC current detector 25N, and second negative electrode-side DC current detector 25N'.

Specifically, second failure detection unit 33E includes fifth determination unit (expression a3 determination unit) 701, sixth determination unit (expression b2 determination unit) 706, seventh determination unit (expression p3 determination unit) 703, and eighth determination unit (expression p3' determination unit) 705. Fifth determination unit 701 makes a determination based on comparison between the detection value of first positive electrode-side DC current detector 25P and the detection value of second positive electrode-side DC current detector 25P'. Sixth determination unit 706 makes a determination based on comparison between the detection value of first negative electrode-side DC current detector 25N and the detection value of second negative electrode-side DC current detector 25N'. Seventh determination unit 703 makes a determination based on comparison between the detection value of first positive electrode-side DC current detector 25P and the detection value of first negative electrode-side DC current detector 25N. Eighth determination unit 705 makes a determination based on comparison between the detection value of second positive electrode-side DC current detector 25P' and the detection value of second negative electrode-side DC current detector 25N'.

Therefore, with the determination results of fifth and sixth determination units 701 and 706, the DC current detector in which installation location is failed can be determined. With the determination results of seventh and eighth determination units 703 and 705, whether the first DC current detector is failed or the second DC current detector is failed can be determined. Thus, with the determination results of the fifth to eighth determination units altogether, which DC current detector is failed can be determined, and the operation of the power conversion device can be continued using the other normal current detector installed at the same location as the failed current detector.

However, in the configuration above, for example, when both of first positive electrode-side DC current detector 25P and second negative electrode-side DC current detector 25N' are failed, the failed DC current detectors are unable to be detected. Therefore, in order to determine a failed DC current detector more accurately, second failure detection unit 33B preferably further includes ninth determination unit (expression m3 determination unit) 702, tenth determination unit (expression m3' determination unit) 704, eleventh determination unit (expression n3 determination unit) 707, and twelfth determination unit (expression n3' determination unit) 708.

Ninth determination unit 702 makes a determination based on comparison between the detection value of first positive electrode-side DC current detector 25P and the sum of detection values of n first upper arm current detectors 22. Tenth determination unit 704 makes a determination based on comparison between the detection value of second positive electrode-side DC current detector 25P' and the sum of detection values of n second upper arm current detectors 22'. Eleventh determination unit 707 makes a determination based on comparison between the detection value of first negative electrode-side DC current detector 25N and the sum of detection values of n first lower arm current detectors 23. Twelfth determination unit 708 makes a determination based on comparison between the detection value of second negative electrode-side DC current detector 23' and the sum of detection values of n second lower arm current detectors. With a combination of the determination results of seventh and eighth determination units 703 and 705 with the determination results of ninth to twelfth determination units 702, 704, 707, and 708, whether the first DC current detector is failed or the second DC current detector is failed can be determined even more accurately.

First failure detection unit 32E further includes ninth to twelfth determination units 702, 704, 707, and 708 in the configuration of first failure detection unit 32D in the fourth embodiment. With a combination of the determination results of third and fourth determination units 604 and 605 with the determination results of ninth to twelfth determination units 702, 704, 707, and 708, whether the first arm current detector is failed or the second arm current detector is failed can be determined even more accurately. Therefore, with the determination results of first to fourth determination units 651, 652, 604, and 605 and ninth to twelfth determination units 702, 704, 707, and 708 altogether, which arm current detector is failed can be determined even more accurately, and the operation can be continued with the other normal current detector provided at the same location as the failed current detector.

Sixth Embodiment

In the sixth embodiment, in addition to first arm current detectors 22 and 23, second arm current detectors 22' and 23', first DC current detectors 25P and 25N, and second DC current detectors 25P' and 25N', first AC current detector 21 and second AC current detector 21' are further provided on each of AC lines 11U, 11V, and 11W.

Figure 16:
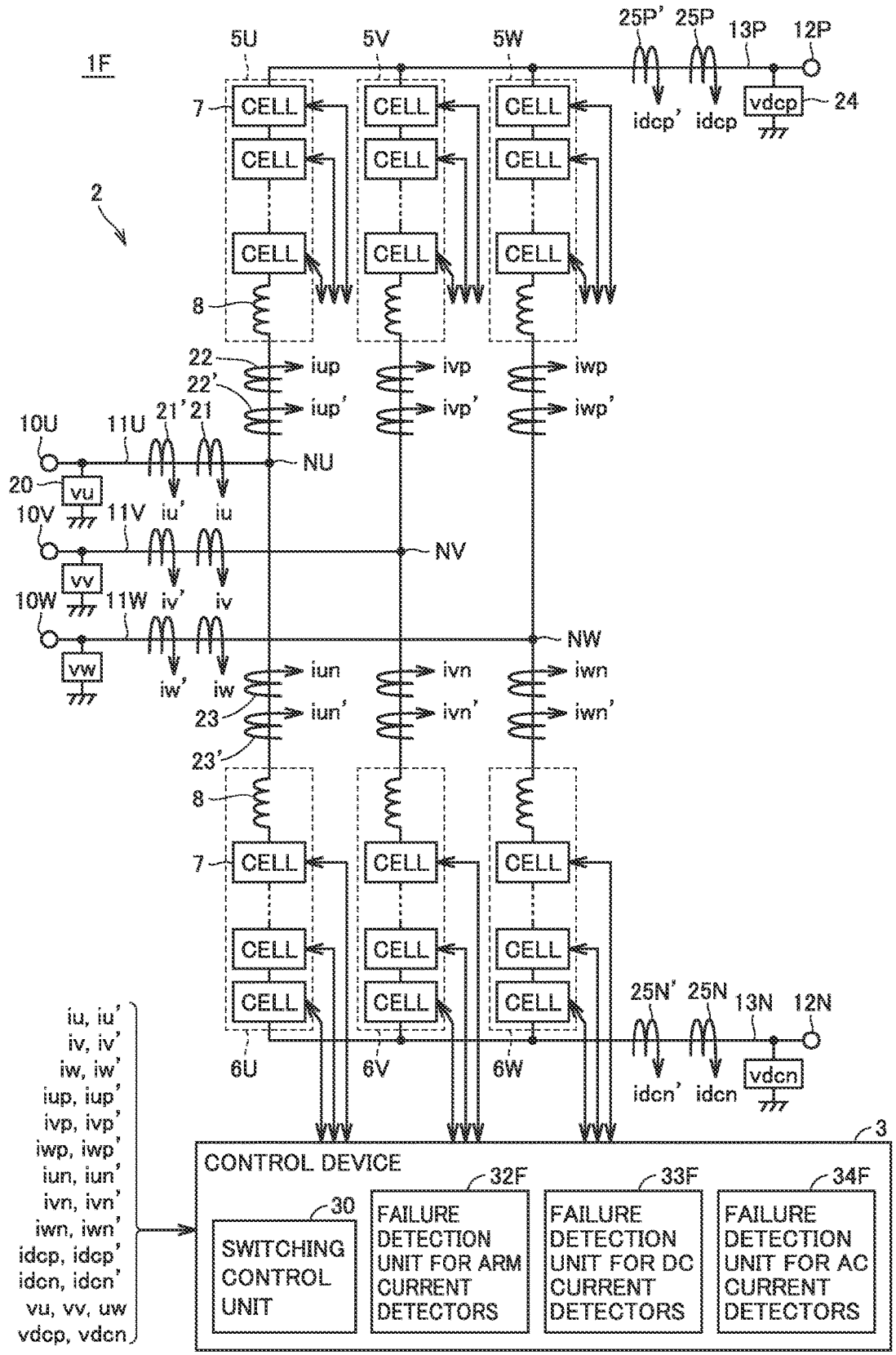
FIG. 16 is a schematic configuration diagram of a power conversion device of a sixth embodiment.

FIG. 16 is a schematic configuration diagram of a power conversion device of the sixth embodiment. A power conversion device 1F in FIG. 16 differs from power conversion device 1E in FIG. 13 in that it further includes a first AC current detector 21 and a second AC current detector 21' provided on each of AC lines 11U, 11V, and 11W.

Switching control unit 30 of control device 3 in FIG. 16 controls the switching of switching elements 41p and 41n of each converter cell 7, further based on the values of iu, iu', iv, iv', iw, and iw' detected by first AC current detectors 21 and second AC current detectors 21'.

Control device 3 in FIG. 13 further differs from control device 3 in FIG. 13 in that it includes a failure detection unit 32F for arm current detectors 22, 23, 22', and 23' and a failure detection unit 33F for DC current detectors 25P, 25N, 25P', and 25N', as well as a failure detection unit 34F for AC current detectors 21 and 21'. In other respects, FIG. 16 is similar to FIG. 13, and the same or corresponding parts are denoted by the same reference signs and will not be further elaborated.

[Operation of Failure Detection Unit 34F for AC Current Detector 21, 21']

The operation of failure detection unit 34F that performs failure detection of first AC current detector 21 and second AC current detector 21' provided on each of AC lines 11U, 11V, and 11W will now be described. The failure determination expressions used in failure detection unit 34F are selected from the failure determination expressions described in the fourth embodiment.

Figure 17:
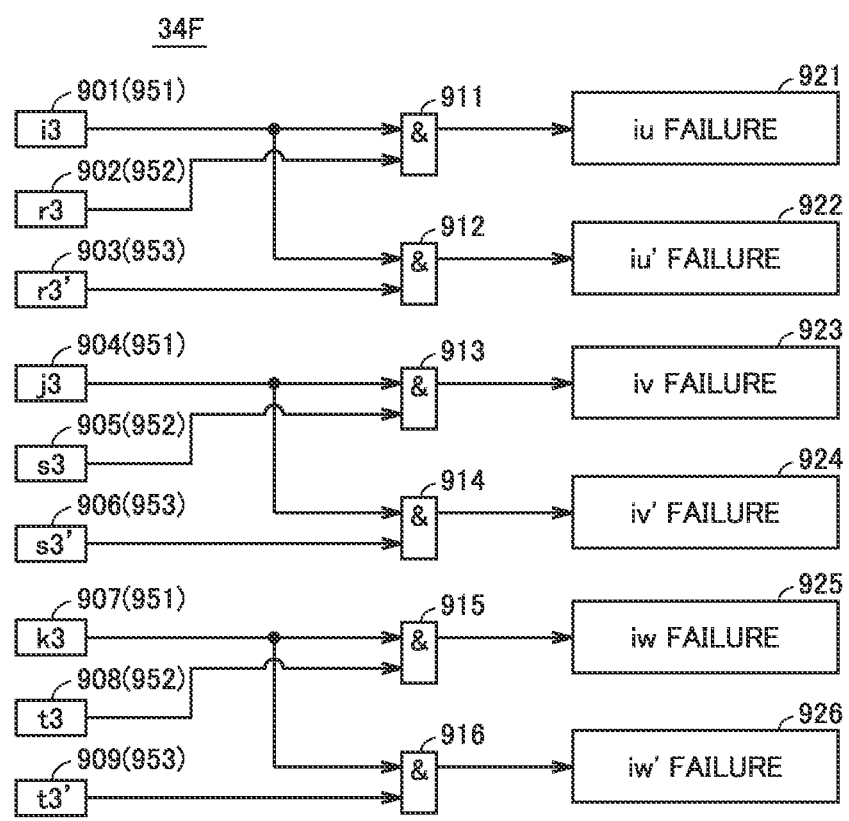
FIG. 17 is a functional block diagram of a failure detection unit that performs failure detection of AC current detectors in FIG. 16.

FIG. 17 is a functional block diagram of the failure detection unit that performs failure detection of AC current detectors in FIG. 16. Referring to FIG. 17, failure detection unit 34F includes an expression i3 determination unit 901, an expression r3 determination unit 902, an expression r3' determination unit 903, an expression j3 determination unit 904, an expression s3 determination unit 905, an expression s3' determination unit 906, an expression k3 determination unit 907, an expression t3 determination unit 908, an expression t3' determination unit 909, AND operators 911 to 916, and determination result output units 921 to 926. The functions of these units are implemented, for example, by CPU 54 in FIG. 3 operating under instructions of a program.

Expression i3 determination unit 901 compares the detection value of first AC current detector 21 provided on U-phase AC line 11U with the detection value of second AC current detector 21' provided on U-phase AC line 11U to determine whether the expression (i3) holds. When the output of expression i3 determination unit 901 is "1", it is indicated that one of AC current detectors 21 and 21' on U-phase AC line 11U is failed.

Expression r3 determination unit 902 compares the value obtained by subtracting the detection value of first lower arm current detector 23 in U-phase lower arm 6U from the detection value of first upper arm current detector 22 in U-phase upper arm 5U with the detection value of first AC current detector 21 on U-phase AC line 11U to determine whether the expression (r3) holds. Therefore, when the output of expression r3 determination unit 902 is "1", it is indicated that one of U-phase first arm current detectors 22 and 23 and U-phase first AC current detector 21 is failed.

Expression r3' determination unit 903 compares the value obtained by subtracting the detection value of second lower arm current detector 23' in U-phase lower arm 6U from the detection value of second upper arm current detector 22' in U-phase upper arm 5U with the detection value of second AC current detector 21' on U-phase AC line 11U to determine whether the expression (r3') holds. Therefore, when the output of expression r3' determination unit 903 is "1", it is indicated that one of U-phase second arm current detectors 22' and 23' and U-phase second AC current detector 21' is failed.

AND operator 911 performs AND operation of the output of expression i3 determination unit 901 and the output of expression r3 determination unit 902. As the result, when the output of AND operator 911 is "1", determination result output unit 921 outputs that U-phase first AC current detector 21 is failed (that is, the detection value of AC current iu is abnormal).

AND operator 912 performs AND operation of the output of expression i3 determination unit 901 and the output of expression r3' determination unit 903. As the result, when the output of AND operator 912 is "1", determination result output unit 922 outputs that U-phase second AC current detector 21' is failed (that is, the detection value of AC current iu' is abnormal).

Expression j3 determination unit 904 compares the detection value of first AC current detector 21 provided on V-phase AC line 11V with the detection value of second AC current detector 21' provided on V-phase AC line 11V to determine whether the expression (j3) holds. When the output of expression j3 determination unit 904 is "1", it is indicated that one of AC current detectors 21 and 21' on V-phase AC line 11V is failed.

Expression s3 determination unit 905 compares the value obtained by subtracting the detection value of first lower arm current detector 23 in V-phase lower arm 6V from the detection value of first upper arm current detector 22 in V-phase upper arm 5V with the detection value of first AC current detector 21 on V-phase AC line 11V to determine whether the expression (s3) holds. Therefore, when the output of expression s3 determination unit 905 is "1", it is indicated that one of V-phase first arm current detectors 22 and 23 and V-phase first AC current detector 21 is failed.

Expression s3' determination unit 906 compares the value obtained by subtracting the detection value of second lower arm current detector 23' in V-phase lower arm 6V from the detection value of second upper arm current detector 22' in V-phase upper arm 5V with the detection value of second AC current detector 21' on V-phase AC line 11V to determine whether the expression (s3') holds. Therefore, when the output of expression s3' determination unit 906 is "1", it is indicated that one of V-phase second arm current detectors 22' and 23' and V-phase second AC current detector 21' is failed.

AND operator 913 performs AND operation of the output of expression j3 determination unit 904 and the output of expression s3 determination unit 905. As the result, when the output of AND operator 913 is "1", determination result output unit 923 outputs that V-phase first AC current detector 21 is failed (that is, the detection value of AC current iv is abnormal).

AND operator 914 performs AND operation of the output of expression j3 determination unit 904 and the output of expression s3' determination unit 906. As the result, when the output of AND operator 914 is "1", determination result output unit 924 outputs that V-phase second AC current detector 21' is failed (that is, the detection value of AC current iv' is abnormal).

Expression k3 determination unit 907 compares the detection value of first AC current detector 21 provided on W-phase AC line 11W with the detection value of second AC current detector 21' provided on W-phase AC line 11W to determine whether the expression (k3) holds. When the output of expression k3 determination unit 907 is "1", it is indicated that one of AC current detectors 21 and 21' on W-phase AC line 11W is failed.

Expression t3 determination unit 908 compares the value obtained by subtracting the detection value of first lower arm current detector 23 in W-phase lower arm 6W from the detection value of first upper arm current detector 22 in W-phase upper arm 5W with the detection value of first AC current detector 21 on W-phase AC line 11W to determine whether the expression (t3) holds. Therefore, when the output of expression t3 determination unit 908 is "1", it is indicated that one of W-phase first arm current detectors 22 and 23 and W-phase first AC current detector 21 is failed.

Expression t3' determination unit 909 compares the value obtained by subtracting the detection value of second lower arm current detector 23' in W-phase lower arm 6W from the detection value of second upper arm current detector 22' in W-phase upper arm 5W with the detection value of second AC current detector 21' on W-phase AC line 11W to determine whether the expression (t3') holds. Therefore, when the output of expression t3' determination unit 909 is "1", it is indicated that one of W-phase second arm current detectors 22' and 23' and W-phase second AC current detector 21' is failed.

AND operator 915 performs AND operation of the output of expression k3 determination unit 907 and the output of expression t3 determination unit 908. As the result, when the output of AND operator 915 is "1", determination result output unit 925 outputs that W-phase first AC current detector 21 is failed (that is, the detection value of AC current iw is abnormal).

AND operator 916 performs AND operation of the output of expression k3 determination unit 907 and the output of expression t3' determination unit 909. As the result, when the output of AND operator 916 is "1", determination result output unit 926 outputs that W-phase second AC current detector 21' is failed (that is, the detection value of AC current iw' is abnormal). As described above, a failed current detector among AC current detectors 21 provided on AC lines 11U, 11V, and 11W can be identified.

[Operation of Failure Detection Unit 33F for DC Current Detectors]

The functional block diagram of failure detection unit 33E illustrated in FIG. 14 can be used as the functional block diagram of failure detection unit 33F in FIG. 16.

[Operation of Failure Detection Unit 32F for Arm Current Detectors]

The functional block diagram of failure detection unit 32E illustrated in FIG. 15 can be used as the functional block diagram of failure detection unit 32F in FIG. 16.

Effects of Sixth Embodiment

To sum up, in power conversion device 1F in the sixth embodiment, in addition to first arm current detectors 22 and 23, second arm current detectors 22' and 23', first DC current detectors 25P and 25N, and second DC current detectors 25P' and 25N', first AC current detector 21 and second AC current detector 21' are provided on each of n AC lines.

Control device 3 includes first failure detection unit 32F having the same configuration as first failure detection unit 32E in the fifth embodiment, second failure detection unit 33F having the same configuration as second failure detection unit 33E in the fifth embodiment, and third failure detection unit 34F. Third failure detection unit 34F detects the presence or absence of failure of each AC current detector, for n first AC current detectors and n second AC current detectors.

First failure detection unit 32F and second failure detection unit 33F achieve operation effects similar to those of first failure detection unit 32E and second failure detection unit 33F in power conversion device 1E of the fifth embodiment. Third failure detection unit 34F includes thirteenth determination unit 951 (expression i3 determination unit 901, expression j3 determination unit 904, expression k3 determination unit 907), fourteenth determination unit 952 (expression r3 determination unit 902, expression s3 determination unit 905, expression t3 determination unit 908), and fifteenth determination unit 953 (expression r3' determination unit 903, expression s3' determination unit 906, expression t3' determination unit 909).

Specifically, thirteenth determination unit 951 makes a determination based on comparison between the detection value of first AC current detector 21 and the detection value of second AC current detector 21' provided on the same AC line 11.

Fourteenth determination unit 952 makes a determination based on comparison of the difference between the detection value of first upper arm current detector 22 provided in any given first upper arm 5 and the detection value of first lower arm current detector 23 provided in lower arm 6 corresponding to the first upper arm 5, with the detection value of first AC current detector 21 provided on AC line 11 corresponding to the first upper arm 5.

Fifteenth determination unit 953 makes a determination based on comparison of the difference between the detection value of second upper arm current detector 22' provided in any given first upper arm 5 and the detection value of second lower arm current detector 23' provided in lower arm 6 corresponding to the first upper arm 5, with the detection value of second AC current detector 21' provided on AC line 11 corresponding to the first upper arm 5.

Therefore, with the determination result of thirteenth determination unit 951, AC current detector 21, 21' on which AC line 11 is failed can be determined. With the determination results of fourteenth and fifteenth determination units 952 and 953, whether the first AC current detector is failed or the second AC current detector is failed can be determined. Thus, with the determination results of the thirteenth to fifteenth determination units 951 to 953 altogether, which fault current detector is failed can be determined, and the operation of the power conversion device can be continued with the other normal current detector installed at the same location as the failed current detector.

Embodiments disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST 1A to 1F power conversion device, 2 power converter, 3 control device, 5, 5U, 5V, 5W upper arm, 6, 6U, 6V, 6W lower arm, 7 converter cell, 11, 11U, 11V, 11W AC line, 13N negative electrode-side DC line, 13P positive electrode-side DC line, 21 (first) AC current detector, 21' second AC current detector, 22 (first) upper arm current detector, 22' second upper arm current detector, 23 (first) lower arm current detector, 23' second lower arm current detector, 25N (first) negative electrode-side DC current detector, 25N' second negative electrode-side DC current detector, 25P (first) positive electrode-side DC current detector, 25P' second positive electrode-side DC current detector, 30 switching control unit, 32A, 32B, 32C, 32D, 32E, 32F first failure detection unit, 33B, 33C, 33E, 33F second failure detection unit, 34C, 34F third failure detection unit, 41 switching element, 42 power storage element, 43 voltage detector, 50 input converter, 54 CPU, 101, 204 first determination unit (expression d2 determination unit), 102 second determination unit (expression k2 determination unit), 103 third determination unit (expression k3 determination unit), 151 fourth determination unit (expression h2, i2, j2 determination unit), 201 second determination unit (expression a2 determination unit), 202 third determination unit (expression b2 determination unit), 451 fourth determination unit (expression e2, f2, g2 determination unit), 651 first determination unit (expression c3, d3, e3 determination unit), 652 second determination unit (expression f3, g3, h3 determination unit), 604 third determination unit (expression q3 determination unit), 605 fourth determination unit (expression q3' determination unit), 701 fifth determination unit (expression a3 determination unit), 706 sixth determination unit (expression b2 determination unit), 703 seventh determination unit (expression p3 determination unit), 705 eighth determination unit (expression p3' determination unit), 702 ninth determination unit (expression m3 determination unit), 704 tenth determination unit (expression m3' determination unit), 707 eleventh determination unit (expression n3 determination unit), 708 twelfth determination unit (expression n3' determination unit), 951 thirteenth determination unit (expression i3, j3, k3 determination unit), 952 fourteenth determination unit (expression r3, s3, t3 determination unit), 953 fifteenth determination unit (expression r3', s3', t3' determination unit), idcn, idcp DC current, idcref DC current command value, iu, iv, iw AC current, iun, iup, ivn, ivp, iwn, iwp arm current.

The invention claimed is:

1. A modular multilevel converter-type power conversion device comprising:
   a positive electrode-side DC line;
   a negative electrode-side DC line;
   n AC lines,
      where n is an integer equal to or greater than two;
   n upper arms respectively corresponding to the n AC lines, each of the n upper arms having one end connected to the positive electrode-side DC line and the other end connected to a corresponding AC line, each upper arm including a plurality of converter cells connected in cascade;
   n lower arms respectively corresponding to the n upper arms, each of the n lower arms having one end connected to the negative electrode-side DC line and the other end connected to the other end of a corresponding upper arm, each lower arm including a plurality of converter cells connected in cascade;
   n upper arm current detectors respectively provided in the n upper arms;
   n lower arm current detectors respectively provided in the n lower arms; and
   a first failure detection unit to detect presence or absence of failure of each current detector, for the n upper arm current detectors and the n lower arm current detectors,
   the first failure detection unit including:
      a first determination unit to make a determination based on comparison between a sum of detection values of the n upper arm current detectors and a sum of detection values of the n lower arm current detectors;
      a second determination unit to make a determination based on comparison between a detection value or a command value of current flowing through the positive electrode-side DC line and the sum of detection values of the n upper arm current detectors;
      a third determination unit to make a determination based on comparison between a detection value or a command value of current flowing through the negative electrode-side DC line and the sum of detection values of the n lower arm current detectors; and
      a fourth determination unit to make a determination based on:
         comparison of a sum of a detection value of an upper arm current detector provided in any given first upper arm and a detection value of a lower arm current detector provided in a lower arm corresponding to the first upper arm with a sum of a detection value of an upper arm current detector provided in another second upper arm and a detection value of a lower arm current detector provided in a lower arm corresponding to the second upper arm.

2. The power conversion device according to claim 1, wherein
   the positive electrode-side DC line and the negative electrode-side DC line are not provided with a current detector,
   the second determination unit makes a determination based on comparison between a command value of current flowing through the positive electrode-side DC line and a sum of detection values of the n upper arm current detectors, and
   the third determination unit makes a determination based on comparison between a command value of current flowing through the negative electrode-side DC line and a sum of detection values of the n lower arm current detectors.

3. The power conversion device according to claim 1, further comprising:
   a positive electrode-side DC current detector to detect DC current flowing through the positive electrode-side DC line; and
   a negative electrode-side DC current detector to detect DC current flowing through the negative electrode-side DC line, wherein
   the second determination unit makes a determination based on comparison between a detection value of the positive electrode-side DC current detector and a sum of detection values of the n upper arm current detectors, and
   the third determination unit makes a determination based on comparison between a detection value of the negative electrode-side DC current detector and a sum of detection values of the n lower arm current detectors.

4. The power conversion device according to claim 3, further comprising a second failure detection unit to detect presence or absence of failure of each of the positive electrode-side DC current detector and the negative electrode-side DC current detector, wherein the second failure detection unit includes:
the first determination unit;
the second determination unit;
the third determination unit; and
a fifth determination unit to make a determination based on comparison between a detection value of the positive electrode-side DC current detector and a detection value of the negative electrode-side DC current detector.

5. The power conversion device according to claim 1, wherein
each of the n AC lines is not provided with a current detector.

6. A modular multilevel converter-type power conversion device comprising:
a positive electrode-side DC line;
a negative electrode-side DC line;
n AC lines,
where n is an integer equal to or greater than two;
n upper arms respectively corresponding to the n AC lines, each of the n upper arms having one end connected to the positive electrode-side DC line and the other end connected to a corresponding AC line, each upper arm including a plurality of converter cells connected in cascade;
n lower arms respectively corresponding to the n upper arms, each of the n lower arms having one end connected to the negative electrode-side DC line and the other end connected to the other end of a corresponding upper arm, each lower arm including a plurality of converter cells connected in cascade;
n upper arm current detectors respectively provided in the n upper arms;
n lower arm current detectors respectively provided in the n lower arms;
n AC current detectors respectively provided on the n AC lines; and
a first failure detection unit to detect presence or absence of failure of each current detector, for the n upper arm current detectors and the n lower arm current detectors, the first failure detection unit including:
a first determination unit to make a determination based on comparison between a sum of detection values of the n upper arm current detectors and a sum of detection values of the n lower arm current detectors;
a second determination unit to make a determination based on comparison between a detection value or a command value of current flowing through the positive electrode-side DC line and the sum of detection values of the n upper arm current detectors;
a third determination unit to make a determination based on comparison between a detection value or a command value of current flowing through the negative electrode-side DC line and the sum of detection values of the n lower arm current detectors; and
a fourth determination unit to make a determination based on comparison of a difference between a detection value of an upper arm current detector provided in any given first upper arm and a detection value of a lower arm current detector provided in a lower arm corresponding to the first upper arm with a detection value of an AC current detector provided on an AC line corresponding to the first upper arm.

7. The power conversion device according to claim 6, further comprising a third failure detection unit to detect presence or absence of failure of each of the n AC current detectors,
wherein the third failure detection unit includes the first determination unit, the second determination unit, the third determination unit, and the fourth determination unit.

8. The power conversion device according to claim 6, further comprising:
a positive electrode-side DC current detector to detect DC current flowing through the positive electrode-side DC line; and
a negative electrode-side DC current detector to detect DC current flowing through the negative electrode-side DC line, wherein
the second determination unit makes a determination based on comparison between a detection value of the positive electrode-side DC current detector and a sum of detection values of the n upper arm current detectors, and
the third determination unit makes a determination based on comparison between a detection value of the negative electrode-side DC current detector and a sum of detection values of the n lower arm current detectors.

9. The power conversion device according to claim 8, further comprising a second failure detection unit to detect presence or absence of failure of each of the positive electrode-side DC current detector and the negative electrode-side DC current detector, wherein
the second failure detection unit includes:
the first determination unit;
the second determination unit;
the third determination unit; and
a fifth determination unit to make a determination based on comparison between a detection value of the positive electrode-side DC current detector and a detection value of the negative electrode-side DC current detector.

10. A modular multilevel converter-type power conversion device comprising:
a positive electrode-side DC line;
a negative electrode-side DC line;
n AC lines,
where n is an integer equal to or greater than two;
n upper arms respectively corresponding to the n AC lines, each of the n upper arms having one end connected to the positive electrode-side DC line and the other end connected to a corresponding AC line, each upper arm including a plurality of converter cells connected in cascade;
n lower arms respectively corresponding to the n upper arms, each of the n lower arms having one end connected to the negative electrode-side DC line and the other end connected to the other end of a corresponding upper arm, each lower arm including a plurality of converter cells connected in cascade;
n first upper arm current detectors respectively provided in the n upper arms;
n second upper arm current detectors respectively provided in the n upper arms;
n first lower arm current detectors respectively provided in the n lower arms; and
n second lower arm current detectors respectively provided in the n lower arms; and
a first failure detection unit to detect presence or absence of failure of each current detector, for the n first upper arm current detectors, the n second upper arm current detectors, the n first lower arm current detectors, and the n second lower arm current detectors, the first failure detection unit including:
- a first determination unit to make a determination based on comparison between a detection value of a first upper arm current detector and a detection value of a second upper arm current detector provided in a same upper arm;
- a second determination unit to make a determination based on comparison between a detection value of a first lower arm current detector and a detection value of a second lower arm current detector provided in a same lower arm;
- a third determination unit to make a determination based on comparison between a sum of detection values of the n first upper arm current detectors and a sum of detection values of the n first lower arm current detectors; and
- a fourth determination unit to make a determination based on comparison between a sum of detection values of the n second upper arm current detectors and a sum of detection values of the n second lower arm current detectors.

11. The power conversion device according to claim 10, further comprising:
- a first positive electrode-side DC current detector and a second positive electrode-side DC current detector to detect DC current flowing through the positive electrode-side DC line;
- a first negative electrode-side DC current detector and a second negative electrode-side DC current detector to detect DC current flowing through the negative electrode-side DC line; and
- a second failure detection unit to detect presence or absence of failure of each of the first positive electrode-side DC current detector, the second positive electrode-side DC current detector, the first negative electrode-side DC current detector, and the second negative electrode-side DC current detector, wherein the second failure detection unit includes:
- a fifth determination unit to make a determination based on comparison between a detection value of the first positive electrode-side DC current detector and a detection value of the second positive electrode-side DC current detector;
- a sixth determination unit to make a determination based on comparison between a detection value of the first negative electrode-side DC current detector and a detection value of the second negative electrode-side DC current detector;
- a seventh determination unit to make a determination based on comparison between a detection value of the first positive electrode-side DC current detector and a detection value of the first negative electrode-side DC current detector; and
- an eighth determination unit to make a determination based on comparison between a detection value of the second positive electrode-side DC current detector and a detection value of the second negative electrode-side DC current detector.

12. The power conversion device according to claim 11, wherein
the second failure detection unit further includes:
- a ninth determination unit to make a determination based on comparison between a detection value of the first positive electrode-side DC current detector and a sum of detection values of the n first upper arm current detectors;
- a tenth determination unit to make a determination based on comparison between a detection value of the second positive electrode-side DC current detector and a sum of detection values of the n second upper arm current detectors;
- an eleventh determination unit to make a determination based on comparison between a detection value of the first negative electrode-side DC current detector and a sum of detection values of the n first lower arm current detectors; and
- a twelfth determination unit to make a determination based on comparison between a detection value of the second negative electrode-side DC current detector and a sum of detection values of the n second lower arm current detectors.

13. The power conversion device according to claim 12, wherein the first failure detection unit further includes the ninth determination unit, the tenth determination unit, the eleventh determination unit, and the twelfth determination unit.

14. The power conversion device according to claim 11, further comprising:
- n first AC current detectors respectively provided on the n AC lines;
- n second AC current detectors respectively provided on the n AC lines; and
- a third failure detection unit to detect presence or absence of failure of each current detector, for the n first AC current detectors and the n second AC current detectors, wherein the third failure detection unit includes:
- a thirteenth determination unit to make a determination based on comparison between a detection value of a first AC current detector and a detection value of a second AC current detector provided on a same AC line;
- a fourteenth determination unit to make a determination based on comparison of a difference between a detection value of a first upper arm current detector provided in any given first upper arm and a detection value of a first lower arm current detector provided in a lower arm corresponding to the first upper arm with a detection value of a first AC current detector provided on an AC line corresponding to the first upper arm; and
- a fifteenth determination unit to make a determination based on comparison of a difference between a detection value of a second upper arm current detector provided in any given second upper arm and a detection value of a second lower arm current detector provided in a lower arm corresponding to the second upper arm with a detection value of a second AC current detector provided on an AC line corresponding to the second upper arm.

* * * * *